United States Patent
Omiya

(10) Patent No.: US 9,058,696 B2
(45) Date of Patent: Jun. 16, 2015

(54) DISPLAY CONTROLLER, DISPLAY CONTROL METHOD AND COMPUTER-READABLE MEDIUM

(71) Applicant: P&W Solutions Co., Ltd., Tokyo (JP)

(72) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 113 days.

(21) Appl. No.: 13/950,896

(22) Filed: Jul. 25, 2013

(65) Prior Publication Data

US 2014/0028682 A1    Jan. 30, 2014

(30) Foreign Application Priority Data

Jul. 26, 2012   (JP) ................. 2012-165999
Mar. 11, 2013   (JP) ................. 2013-047862
Jun. 26, 2013   (JP) ................. 2013-133905

(51) Int. Cl.
  *G09G 5/00*   (2006.01)
  *G06T 11/20*   (2006.01)
  *G09G 5/36*   (2006.01)

(52) U.S. Cl.
  CPC .............. *G06T 11/206* (2013.01); *G09G 5/363* (2013.01)

(58) Field of Classification Search
  None
  See application file for complete search history.

(56) References Cited

U.S. PATENT DOCUMENTS

| 2009/0125705 | A1* | 5/2009 | Orii ............................. 712/220 |
| 2010/0079463 | A1* | 4/2010 | Rabin .......................... 345/440 |
| 2011/0271172 | A1* | 11/2011 | Radakovitz et al. ......... 715/212 |
| 2012/0150446 | A1* | 6/2012 | Chang et al. ................... 702/3 |
| 2013/0187923 | A1* | 7/2013 | Yoshimoto et al. .......... 345/440 |
| 2013/0187948 | A1* | 7/2013 | Yoshimoto et al. .......... 345/629 |

FOREIGN PATENT DOCUMENTS

JP   2010-183449 A   8/2010

* cited by examiner

*Primary Examiner* — Jwalant Amin
(74) *Attorney, Agent, or Firm* — SoCal IP Law Group LLP; Steven C. Sereboff; John E. Gunther

(57) ABSTRACT

A graph image generation unit 42 constructs a two-dimensional space and generates data of a graph image in the space, in which a graph G of a type is rendered. A coordinate receiving unit 43 receives an arbitrary coordinate in an arbitrary timeline TL designated by a user operation, among coordinates in at least two axes defining the space. A line image generation unit 44 acquires information of the space from the graph image generation unit 42, and generates data of the line image in the space, the line image passing through at least the coordinate in the received timeline TL. An image synthesis unit 45 generates data of the synthesized image by combining the data of the graph image with the data of the line image 111*b* in which the line is rendered. A display control unit 46 controls a display unit 17 to display the synthesized image.

12 Claims, 23 Drawing Sheets

FIG. 19

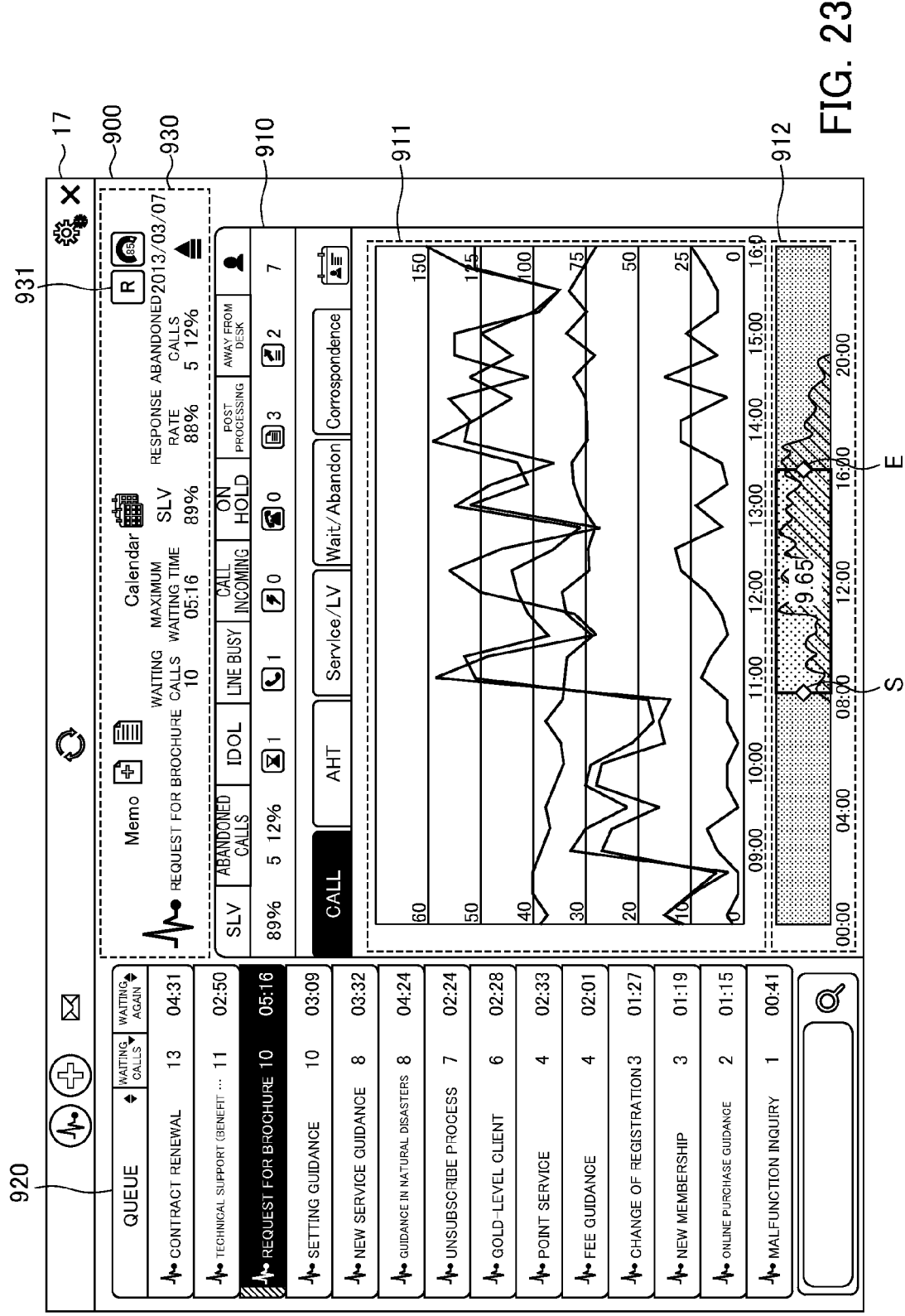

DISPLAY CONTROLLER, DISPLAY CONTROL METHOD AND COMPUTER-READABLE MEDIUM

This application is based on and claims the benefit of priority from Japanese Patent Application No. 2012-165999, filed on 26 Jul. 2012, Japanese Patent Application No. 2013-047862, filed on 11 Mar. 2013 and Japanese Patent Application No. 2013-133905, filed on 26 Jun. 2013, the content of which is incorporated herein by reference.

BACKGROUND OF THE INVENTION

1. Field of the Invention

The present invention relates to a display controller, and a display control method and computer-readable medium.

2. Related Art

In recent years, a management method known as WFM (Workforce Management) has gained attention, which adjusts balance between service quality to be ensured and labor cost. Such WFM is implemented at a contact center (a call center) that serves as a technical support desk for customers. In other words, such WFM is implemented at a contact center in which efficient use and deployment of workforce is achieved by predicting the required number of staff in advance based on an analysis of operation status of each operator, for the purpose of maintaining the quality of response to customers while curbing labor cost.

Sweet Series provided by P&W Solutions Co., Ltd. is widely known as a tool suitable for WFM. This Sweet Series enables prediction of call volume distribution by using time series graphs that display information such as past call volume and response results in time series. For example, Patent Document 1 discloses a control unit for displaying such a time series graph.

Patent Document 1: Japanese Unexamined Patent Application, Publication No. 2010-183449

SUMMARY OF THE INVENTION

The control unit disclosed in Patent Document 1 is further required to be able to easily compare data between various types of graphs while changing the types of graphs.

The present invention has been made in view of this situation, and provides a display controller with which data can be easily compared between various types of graphs while changing the types of graphs.

In order to achieve an object as described above, a display controller according to an aspect of the present invention includes:

a graph selection receiving unit that receives a single type of graph that is selected as a display object from among a plurality of types of graphs, by a user operation;

a graph image generation unit that constructs a predetermined space defined by at least two axes, and generates data of a graph image in the space, in which the type of graph received by the graph selection receiving unit is rendered;

a coordinate receiving unit that receives an arbitrary coordinate in an arbitrary axis designated by a user operation, among the at least two axes defining the space;

a line image generation unit that acquires information of the space from the graph image generation unit, and generates data of a line image in the space, the line image rendering a line passing through at least the coordinate in the axis received by the coordinate receiving unit;

an image synthesis unit that generates data of a synthesized image by combining the data of the graph image with the data of the line image; and a display control unit that controls a display unit to display the synthesized image.

According to the present invention, even in a case in which types of graphs are changed, the data at a corresponding coordinate in each graph can be easily compared by displaying information corresponding to the coordinate as desired by the user.

BRIEF DESCRIPTION OF THE DRAWINGS

FIG. 19 is a diagram showing an example of an image for determining a license for a call trace, in which the image is displayed under the control of the display controller shown in FIG. 2;

FIG. 23 is a diagram showing an example of a synthesized image capable of indicating a response rate and a service level, showing a screen transition up to where a synthesized image of an example different from the example in FIG. 20 is displayed under the control of the display controller shown in FIG. 2.

DETAILED DESCRIPTION OF THE INVENTION

Descriptions of an embodiment of the present invention are hereafter provided with reference to the drawings as appropriate.

Figure 1:
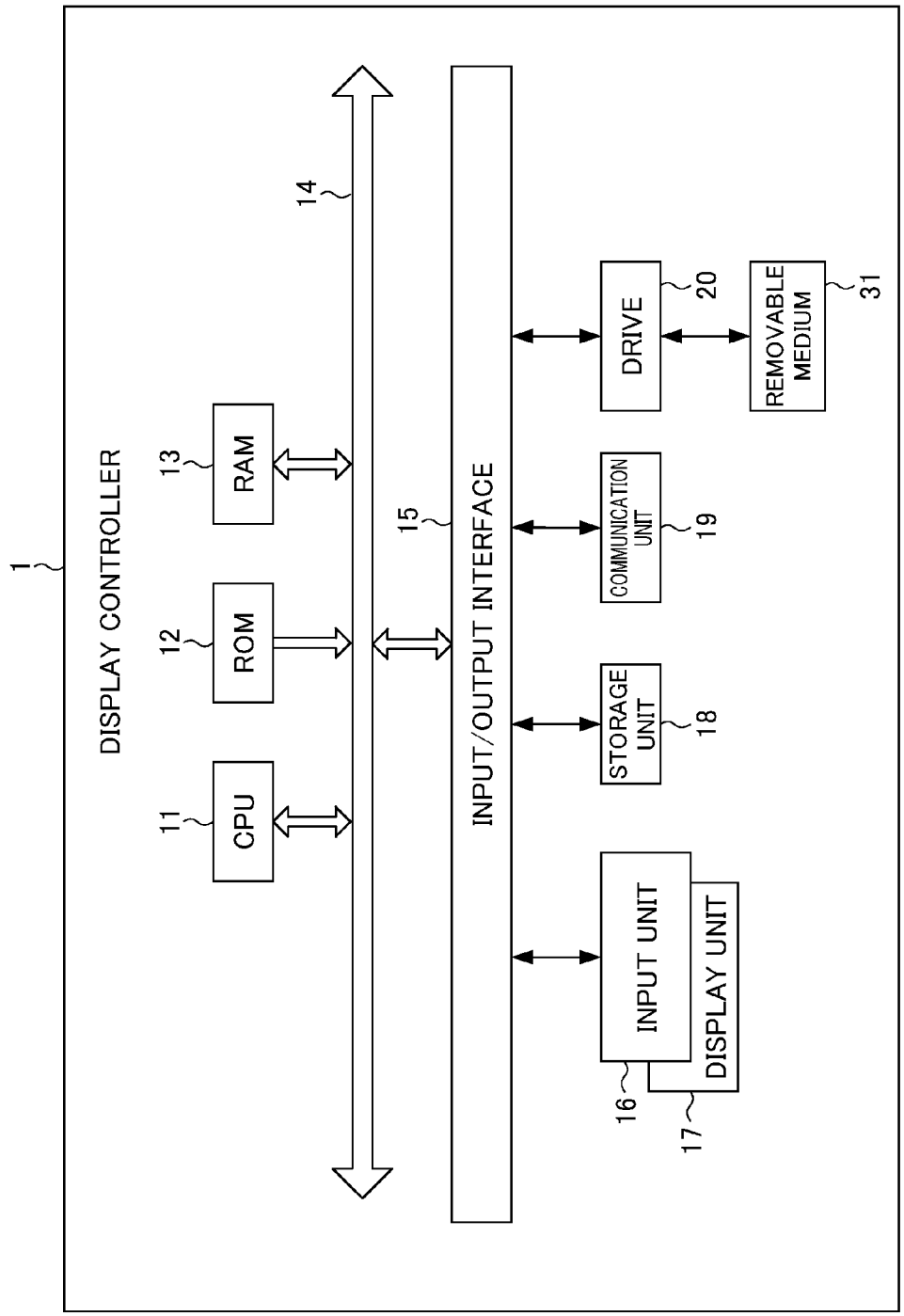
FIG. 1 is a block diagram showing a hardware configuration of a display controller according to an embodiment of the present invention.

FIG. 1 is a block diagram showing a hardware configuration of a display controller of the embodiment of the present invention.

A display controller 1 is configured as, for example, a touchscreen tablet.

The display controller 1 includes: a CPU (Central Processing Unit) 11, ROM (Read Only Memory) 12, RAM (Random Access Memory) 13, a bus 14, an input/output interface 15, an input unit 16, a display unit 17, a storage unit 18, a communication unit 19, and a drive 20.

The CPU 11 executes various types of processing in accordance with programs recorded in the ROM 12 or programs loaded into the RAM 13 from the storage unit 18.

The RAM 13 appropriately stores data, etc. required for the CPU 11 to execute various types of processing.

The CPU 11, the ROM 12 and the RAM 13 are mutually connected via the bus 4. The input/output interface 15 is also connected to the bus 14. The input unit 16, the display unit 17, the storage unit 18, the communication unit 19 and the drive 20 are connected to the input/output interface 15.

The input unit 16 is configured to include a capacitive or resistive touchscreen that is laminated on a display screen of the display unit 17. The touchscreen detects coordinates of a position where a touch operation is performed (hereinafter referred to as "touch position").

In this regard, the touch operation refers to an operation of an object (a finger or stylus of a user) to touch or approach the touchscreen.

The display unit 17 is configured by a display to display various images.

The storage unit 18 is configured by a hard disk or DRAM (Dynamic Random Access Memory), and stores data of various images.

The communication unit 19 controls communication with other devices (not shown) via networks including the Internet.

A removable medium 31 is mounted to the drive 20 as appropriate. The removable medium 31 is composed of a magnetic disk, an optical disk, a magneto-optical disk, semiconductor memory, or the like. The drive 20 reads a program(s) from the removable medium 31. The program(s) is installed in the storage unit 18 as necessary. Similar to the storage unit 18, the removable medium 31 can also store a variety of data such as image data stored in the storage unit 18.

The CPU 11 of the display controller 1 having such a configuration generates data of an image showing a selected type of graph (hereinafter referred to as "graph image") and an image including a line showing selected coordinates (hereinafter referred to as "line image") independently from each other. The CPU 11 generates data of a synthesized image by combining the data of the graph image with the data of the line image. The CPU 11 controls the display unit 17 to display the synthesized image. A sequence of processing up to displaying this type of synthesized image on the display unit 17 is hereinafter referred to as "line image fixed-display processing".

Descriptions are hereinafter provided for a functional configuration for executing the line image fixed-display processing.

Figure 2:
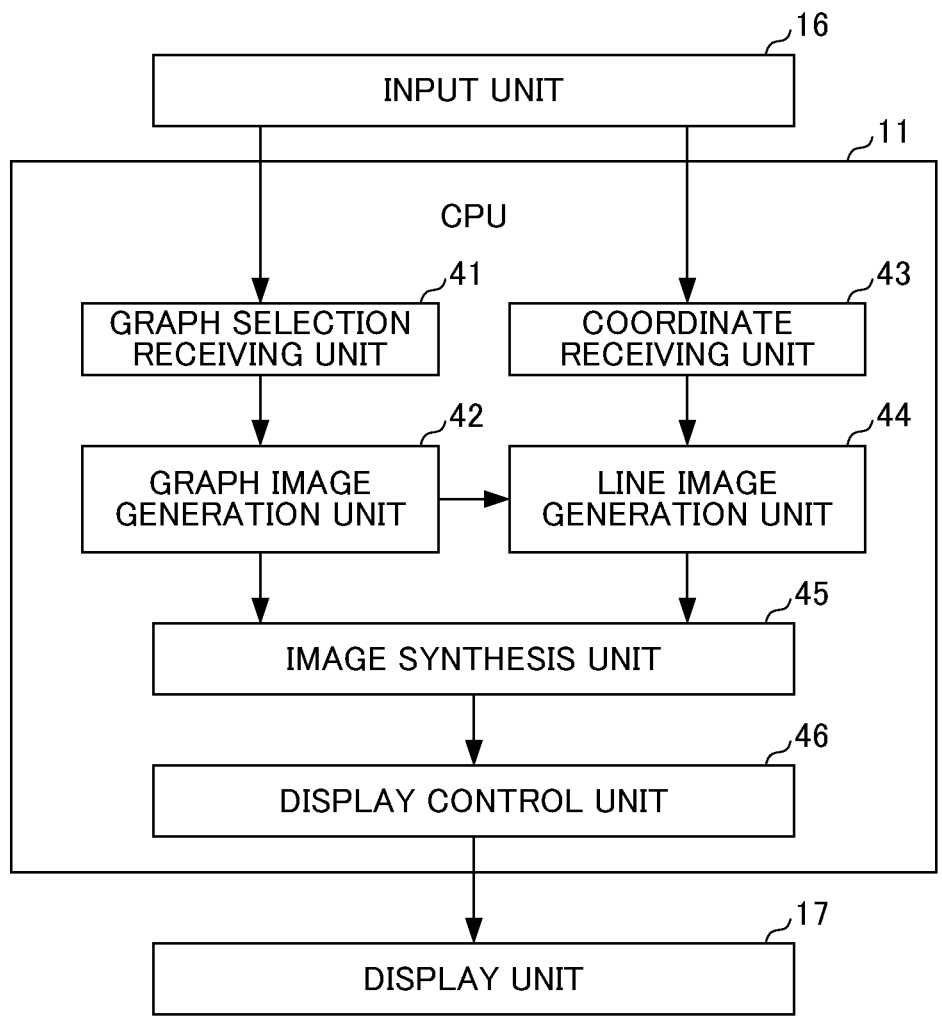
FIG. 2 is a functional block diagram showing a functional configuration for executing line image fixed-display processing, among functional configurations of the display controller.

FIG. 2 is a functional block diagram showing a functional configuration for executing such line image fixed-display processing, among functional configurations of the display controller 1 shown in FIG. 1.

In a case of controlling execution of the line image fixed-display processing, a graph selection receiving unit 41, a graph image generation unit 42, a coordinate receiving unit 43, a line image generation unit 44, an image synthesis unit 45, and a display control unit 46 function in the CPU 11.

The units including the graph selection receiving unit 41 to the display control unit 46 functioning in the CPU 11 are only an example. In other words, at least some of the functions of the units including the graph selection receiving unit 41 to the display control unit 46 can also be assigned to components other than the CPU 11 (for example, a special purpose processor for image processing, etc. (not shown)).

The graph selection receiving unit 41 receives a single type of graph that is selected as a display object from among a plurality of types of graphs by a user operation on the input unit 16. In the present embodiment, since the input unit 16 includes the touchscreen, the graph selection receiving unit 41 detects a touch operation performed by the user to the touchscreen, and recognizes a touch position thereof.

Multiple types of graphs are received by the graph selection receiving unit 41, depending on information regarding call volume at a contact center (response rate, actual-record call volume, predicted call volume, etc.). The graph selection receiving unit 41 receives a type of graph, and reports the type of graph received to the graph image generation unit 42.

The graph image generation unit 42 constructs a predetermined space, renders an image of the type of graph received by the graph selection receiving unit 41, and generates the image as data of a graph image in the space. The graph image generation unit 42 can construct an arbitrary space as long as a graph can be rendered therein. In the present embodiment, the graph image generation unit 42 constructs a two-dimensional space with a vertical axis representing a predetermined frequency and a horizontal axis representing a time axis, and generates data of a graph image rendered as a graph in the two-dimensional space. The graph image generation unit 42 supplies the line image generation unit 44 and the image synthesis unit 45 with information regarding the constructed space, for example, a variety of information regarding the vertical axis representing a predetermined frequency and the horizontal axis representing the time axis.

The coordinate receiving unit 43 receives an arbitrary coordinate in an arbitrary axis designated by the user operating the input unit 16, from among axes (the vertical axis representing a predetermined frequency and the horizontal axis representing the time axis) of the predetermined space constructed by the graph image generation unit 42. In the present embodiment, since the input unit 16 includes the touchscreen, the coordinate receiving unit 43 receives, for example, a touch operation with respect to an arbitrary position on the graph image displayed on the display unit 17. The coordinate receiving unit 43 converts the touch position (coordinates in the screen of the display unit 17) into coordinates thereof in the two-dimensional space in which a graph is rendered (a coordinate in the vertical axis representing a predetermined frequency, and a coordinate in the horizontal axis representing the time axis), and reports the converted coordinates to the line image generation unit 44.

The line image generation unit 44 generates data of a line image by acquiring information about the space, more specifically, a variety of information about the vertical axis representing a predetermined frequency and the horizontal axis representing the time axis, from the graph image generation unit 42, and by rendering a line that passes through at least the coordinate in the axis received by the coordinate receiving unit 43 in the predetermined space (the two-dimensional space in this case) constructed by the graph image generation unit 42. Further details of the technique of generating data of a line image will be described later with reference to FIGS. 4 and 5. The line image generation unit 44 supplies the data of the generated line image to the image synthesis unit 45.

The image synthesis unit 45 generates data of a synthesized image by combining the data of the graph image generated by the graph image generation unit 42, with the data of the line image generated by the line image generation unit 44. Further details of the technique of generating data of a synthesized image will be described later with reference to FIGS. 4 and 5. The image synthesis unit 45 supplies the data of the generated synthesized image to the display control unit 46.

When the data of the synthesized image is supplied from the image synthesis unit 45, the display control unit 46 executes control to generate a display image including the synthesized image to be displayed on the display unit 17.

Figure 3:
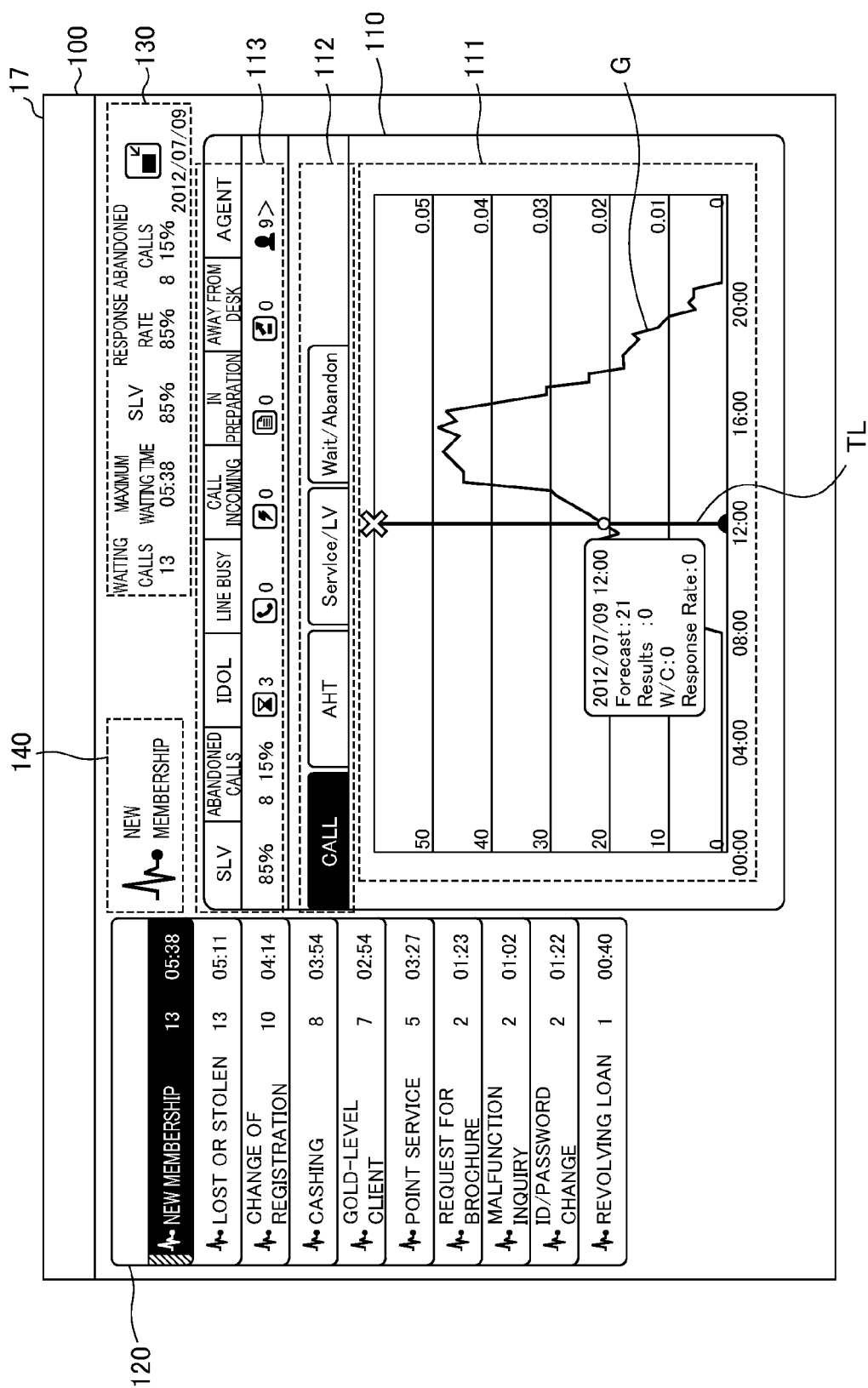
FIG. 3 is a diagram showing an example of a display image that is displayed under control of the display controller shown in FIG. 2.

Here, descriptions are provided for an example of a display image displayed on the display unit 17 with reference to FIG. 3.

FIG. 3 is a diagram showing an example of a display image displayed on the display unit 17 under the control of the display control unit 46.

As shown in FIG. 3, a display image 100 is configured to include: a main display area 110, a type display area 120, an individual information display area 130, and a selected information display area 140.

The main display area 110 is configured to include: a graph display area 111, a service status display area 112, and an icon information display area 113.

Detailed information to be confirmed by the user is displayed in the graph display area 111. In the present embodiment, a graph image including a time series graph G of a predetermined type is displayed in the graph display area 111, and a synthesized image including the graph image and a line image (an image including a timeline TL indicating a predetermined time) is displayed in the graph display area 111, as necessary. Furthermore, although not illustrated in FIG. 3, another synthesized image, with which a different type of graph image combined, can also be displayed in the graph display area 111 while the timeline TL is fixed, i.e. while the identical line image continues to be displayed, as necessary.

In the example shown in FIG. 3, a plurality of types of information such as a response rate, actual-record call volume, and predicted call volume are provided as information about the call volume at the contact center; and a time series graph G of an arbitrary type among the plurality of types of information is displayed in the graph display area 111.

Clearly, the time series graph image G displayed in the graph display area 111 is not limited to a graph of call volume at the contact center, but may be an arbitrary type of graph such as a stock price chart, for example.

A technique of displaying a graph image as well as a synthesized image including the graph image and a line image in the graph display area 111 will be described later in detail with reference to FIGS. 4 and 5.

A plurality of tabs each representing a type of graph (type of service) to be displayed in the graph display area 111 are displayed in the service status display area 112. In the example shown in FIG. 3, a plurality of tabs respectively corresponding to a plurality of types of graphs such as "CALL", "AHT", "Service/LV" and "Wait/Abandon" are displayed in the service status display area 112.

Individual information corresponding to the graph displayed in the graph display area 111 is displayed together with a plurality of icons in the icon information display area 113.

A plurality of tabs respectively representing the plurality of types of graphs to be displayed in the graph display area 111 are displayed in the type display area 120. In the example shown in FIG. 3, a plurality of tabs respectively corresponding to a plurality of types of graphs such as "new membership", "lost or stolen", "change of registration", "cashing", "gold-level client", "point service", "request for brochure", "malfunction inquiry", "ID/password change" and "revolving loan" are displayed in the type display area 120.

Individual information corresponding to a graph image (which may be a synthesized image) displayed in the graph display area 111 is displayed in the individual information display area 130.

The type of graph currently selected by the user is displayed in the selected information display area 140. The types of graphs displayed in the selected information display area 140 correspond to the respective tabs displayed in the type display area 120.

Figure 4:
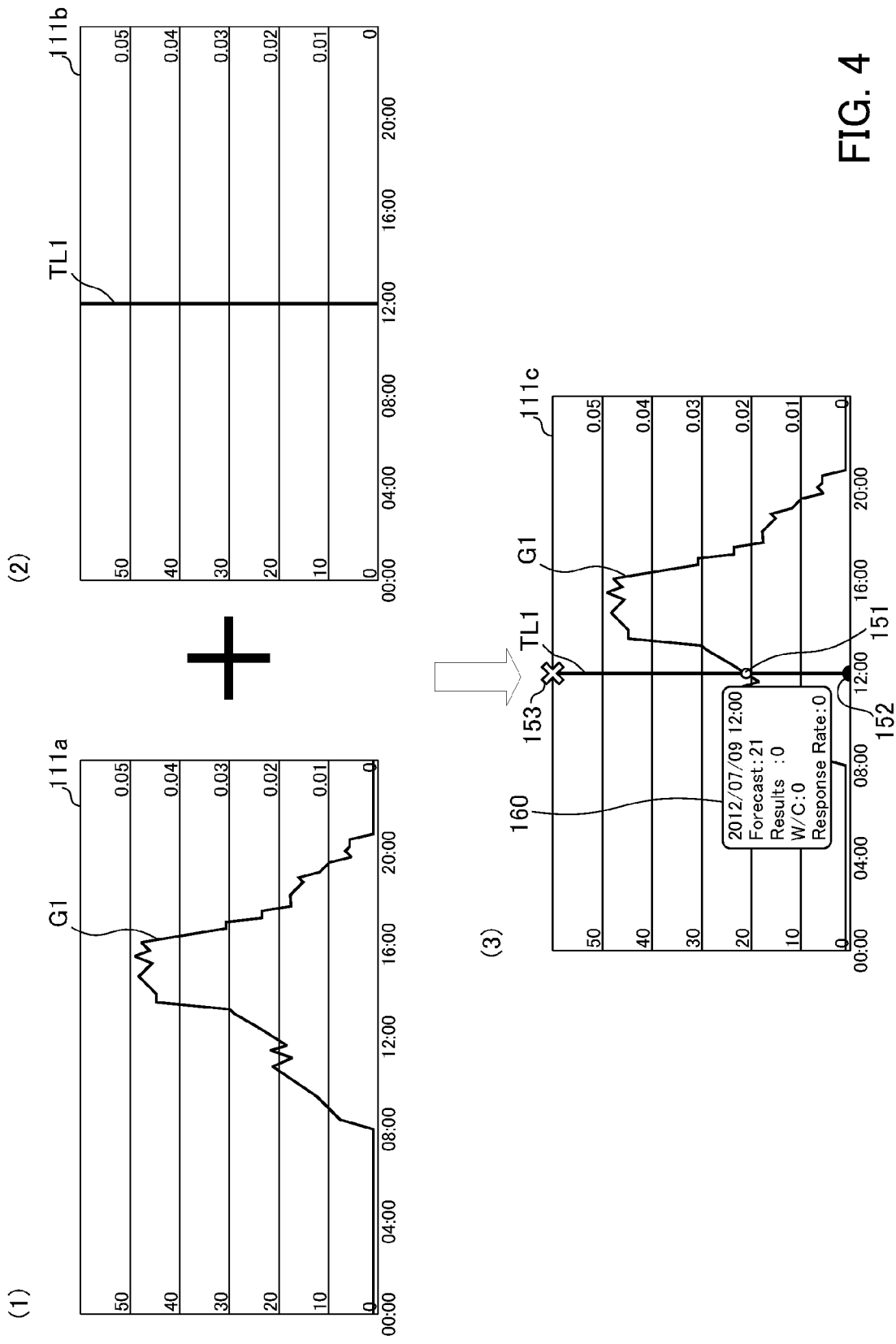
FIG. 4 is a diagram showing a brief overview of a technique of generating data of a synthesized image by the display controller shown in FIG. 2.
Figure 5:
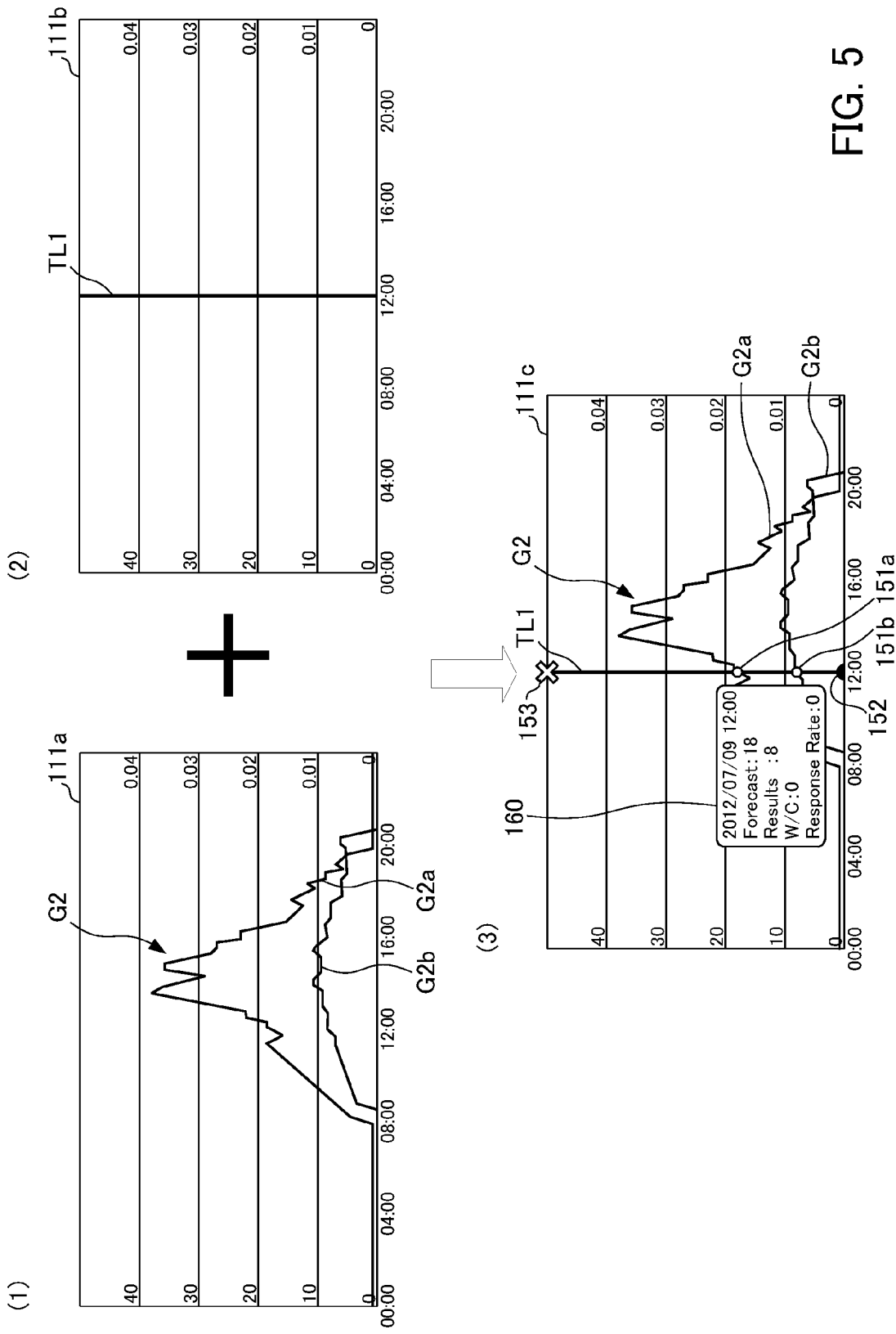
FIG. 5 is a diagram showing a brief overview of a technique of generating data of a synthesized image by the display controller shown in FIG. 2.

Referring now to FIGS. 4 and 5, specific descriptions are provided for a technique of generating a synthesized image displayed on the display unit 17 under the control of the display control unit 46.

FIG. 4 is a diagram showing a brief overview of a technique of generating a synthesized image displayed on the display unit 17 under the control of the display control unit 46.

Firstly, the graph selection receiving unit 41 receives selection of a type of graph through a user operation. Types of the graphs receivable by the graph selection receiving unit 41 correspond to the types of tabs displayed in the type display area 120 shown in FIG. 3; and in the example shown in FIG. 4, "new membership" is selected.

As shown in FIG. 4 (1), in a case in which a selection of a type of graph was received from the user, the graph image generation unit 42 firstly constructs a two-dimensional space defined by the vertical axis showing call volume (measure) at the contact center and the horizontal axis as the time axis. Subsequently, the graph image generation unit 42 acquires time series data of the call volume (measure) at the contact center, regarding the received type of graph, i.e. "new membership". By plotting the time series data in the two-dimensional space, the graph image generation unit 42 generates data of a graph image 111a, in which a graph G1 is rendered. The graph image 111a includes the vertical axis indicating respective values of the call volume (measure) at the contact center, and the horizontal axis (time axis) indicating respective time t.

Subsequently, the coordinate receiving unit 43 receives a predetermined coordinate in a predetermined axis, from among the two axes of the graph image 111a generated by the graph image generation unit 42, i.e. the vertical axis indicating each value of the call volume (measure) at the contact center, and the horizontal axis (time axis) indicating each time t.

For the purpose of simplifying the descriptions, it is assumed herein that the respective values (respective time t) in the horizontal axis (time axis) are designated by a user operation, although clearly the respective values (call volume) in the vertical axis can also be designated by a user operation.

The coordinate receiving unit 43 receives arbitrary time t (a coordinate in the time axis) designated by the user operation. It is assumed herein that time "12:00" is designated by the user operation.

As shown in FIG. 4 (2), the line image generation unit 44 generates data of a line image 111b by arranging the two axes of the graph image 111a generated by the graph image generation unit 42, i.e. the vertical axis indicating the respective values of the call volume (measure) at the contact center, and the horizontal axis (time axis) indicating the respective time t, in the spatial arrangement identical to the graph image 111a, and by rendering a timeline TL1, which passes through the time "12:00" (a coordinate in the time axis) designated by the user operation, and which is substantially parallel with the vertical axis.

In FIG. 4 (2), in order to facilitate understanding of the technique of generating a synthesized image, although the line image 111b also includes the horizontal axis and the vertical axis (as well respective values of the axes), there is no particular necessity for the line image 111b to include the horizontal axis and the vertical axis (as well as respective values of the axes), and it is sufficient if the line image 111b satisfies a correspondence relationship with the graph image 111a. In other words, it is sufficient if the line image 111b includes a timeline TL1.

In this way, each data item of the graph image 111a and the line image 111b is generated in a mutually independent manner. Therefore, only one of the images can also be displayed. For example, only the graph image 111a may be displayed in the graph display area 111.

As shown in FIG. 4 (3), the image synthesis unit 45 generates data of a synthesized image 111c by combining the data of the generated graph image 111a in FIG. 4 (1) with the data of the generated line image 111b in FIG. 4 (2).

In a case in which the image synthesis unit 45 generates data of the synthesized image 111c, the image synthesis unit 45 can also synthesize, as necessary, an intersection 151 of the timeline TL with the graph G, an intersection 152 of the timeline TL with the time axis (horizontal axis), and an intersection 153 of the timeline TL with a horizontal rule showing the top edge of the graph display area 111, as well as an image showing information 160 (hereinafter also referred to as "intersection information 160") regarding the intersection 151. The intersection information 160 includes: information of the date and the time t (time t indicated by the timeline TL) corresponding to the intersection 151; and call volume (a value in the vertical axis) corresponding to the intersection 151, i.e. information of the call volume (measure) regarding "new membership" at the time t at the contact center. The intersection information 160 also includes information of a result of the call volume (measure) at the time t, and information such as an answer ratio at the time t. Although a position of displaying the intersection information 160 is an arbitrary position, it is convenient for the user if the position thereof is in the vicinity of the intersection 151 as shown in the example in FIG. 4.

Here, in a case in which the user wishes to know another type of call volume (measure) at the contact center at the time t indicated by the timeline TL (the time "12:00" in the example shown in FIG. 4), the user can operate the input unit 16 to change the type of graph. In this case, data of a new synthesized image is generated.

Accordingly, with reference to FIG. 5, descriptions are hereinafter provided for a technique of generating data of a new synthesized image in a case in which the graph selection receiving unit 41 receives selection of a new type of graph G FIG. 5 is a diagram showing a brief overview of a technique of generating another synthesized image displayed on the display unit 17 under the control of the display control unit 46.

Firstly, the graph selection receiving unit 41 receives selection of a graph type through a user operation. In the example shown in FIG. 5, "lost or stolen" is selected.

As shown in FIG. 5 (1), the graph image generation unit 42 constructs a two-dimensional space identical to the graph image 111a as shown in FIG. 4 (the two-dimensional space remains unchanged). Subsequently, the graph image generation unit 42 acquires time series data of call volume (measure) at the contact center, regarding the received type of graph, i.e. "lost or stolen". By plotting the time series data in the two-dimensional space, the graph image generation unit 42 generates data of a new graph image 111a, in which a graph G2 is rendered. The graph G2 is configured by two graphs G2a and G2b.

In this case, since the coordinate in the time axis (at the time t) remains unchanged, the data of the line image 111b shown in FIG. 4 (2), i.e. the data including the timeline TL indicating the time "12:00", is reused as unchanged.

As shown in FIG. 5 (3), the image synthesis unit 45 generates data of a new synthesized image 111c by combining the data of the newly generated graph image 111a in FIG. 5 (1) with the data of the line image 111b in FIG. 5 (2) reused from FIG. 4 (2).

Since the graph G2 is configured by the two graphs G2a and G2b, the number of intersections and the amount of intersection information included in the synthesized image are also increased accordingly. In other words, as shown in FIG. 5 (3), the synthesized image includes intersections 151a and 151b of the timeline TL1 with the plurality of graphs G2a and G2b, respectively, as well as the intersection information 160 thereof.

In this way, in a case in which the type of graph is changed, only the data of the graph image 111a is updated, and the data of the line image 111b is not updated. Therefore, the synthesized image to be displayed is formed by combining the identical line image 111b with the different types of graph images 111a. In other words, the type of graph is changed from the graph G1 to the graph G2, while the line TL is fixed to indicate the time desired the user. As a result, the user can easily compare data of different types at any desired time.

Here, the user can operate the input unit 16 to cause the display controller 1 to store predetermined information (reminder, etc.) regarding the time t indicated by the timeline TL (the time "12:00" in the example shown in FIG. 4). In this case, data of a new synthesized image is generated.

Accordingly, with reference to FIGS. 6 to 8, descriptions are hereinafter provided for a technique of generating data of a new synthesized image in a case in which the coordinate receiving unit 43 receives an input of predetermined information.

Figure 6:
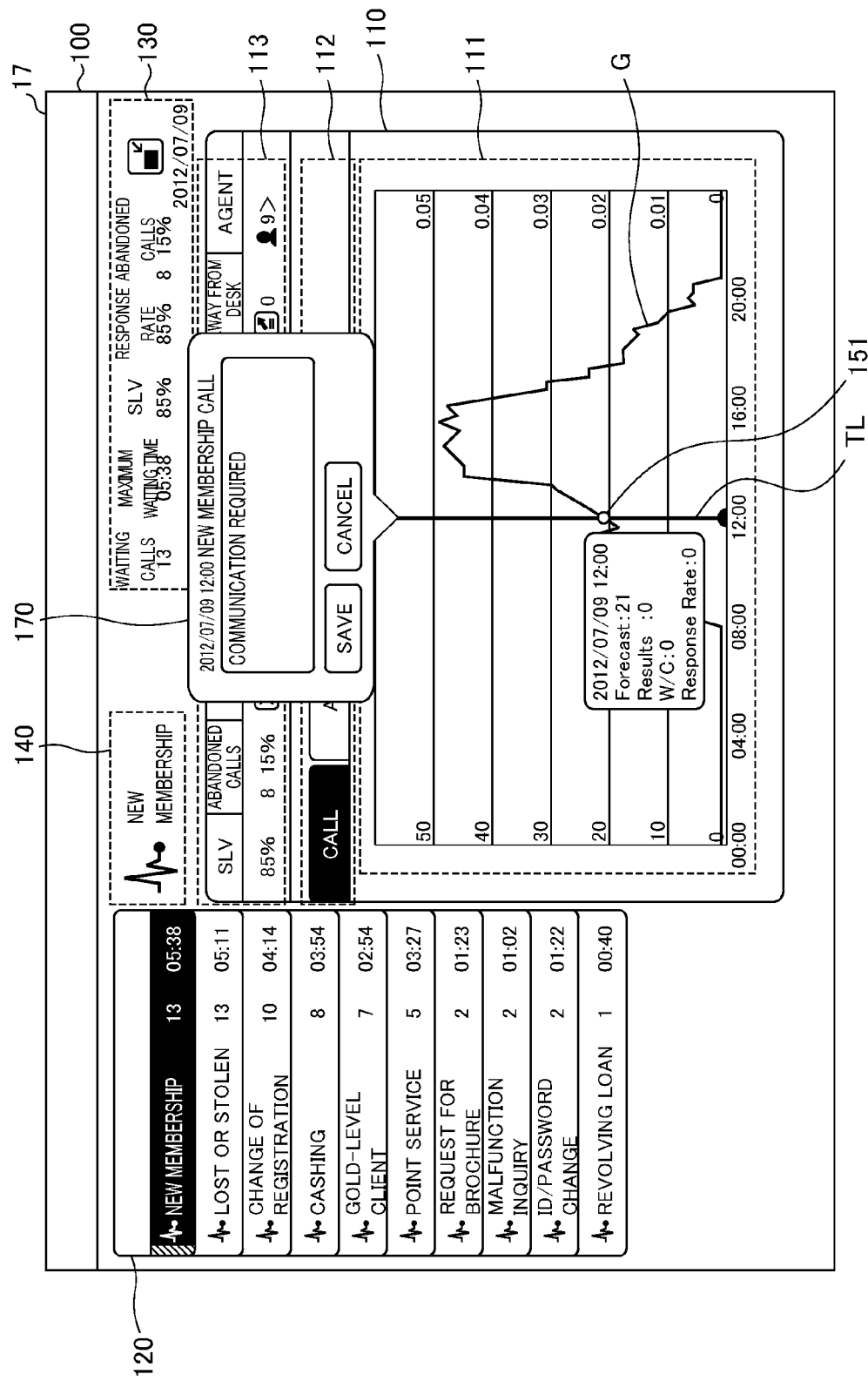
FIG. 6 is a diagram showing an example of a synthesized image that is displayed under control of the display controller shown in FIG. 2.
Figure 7:
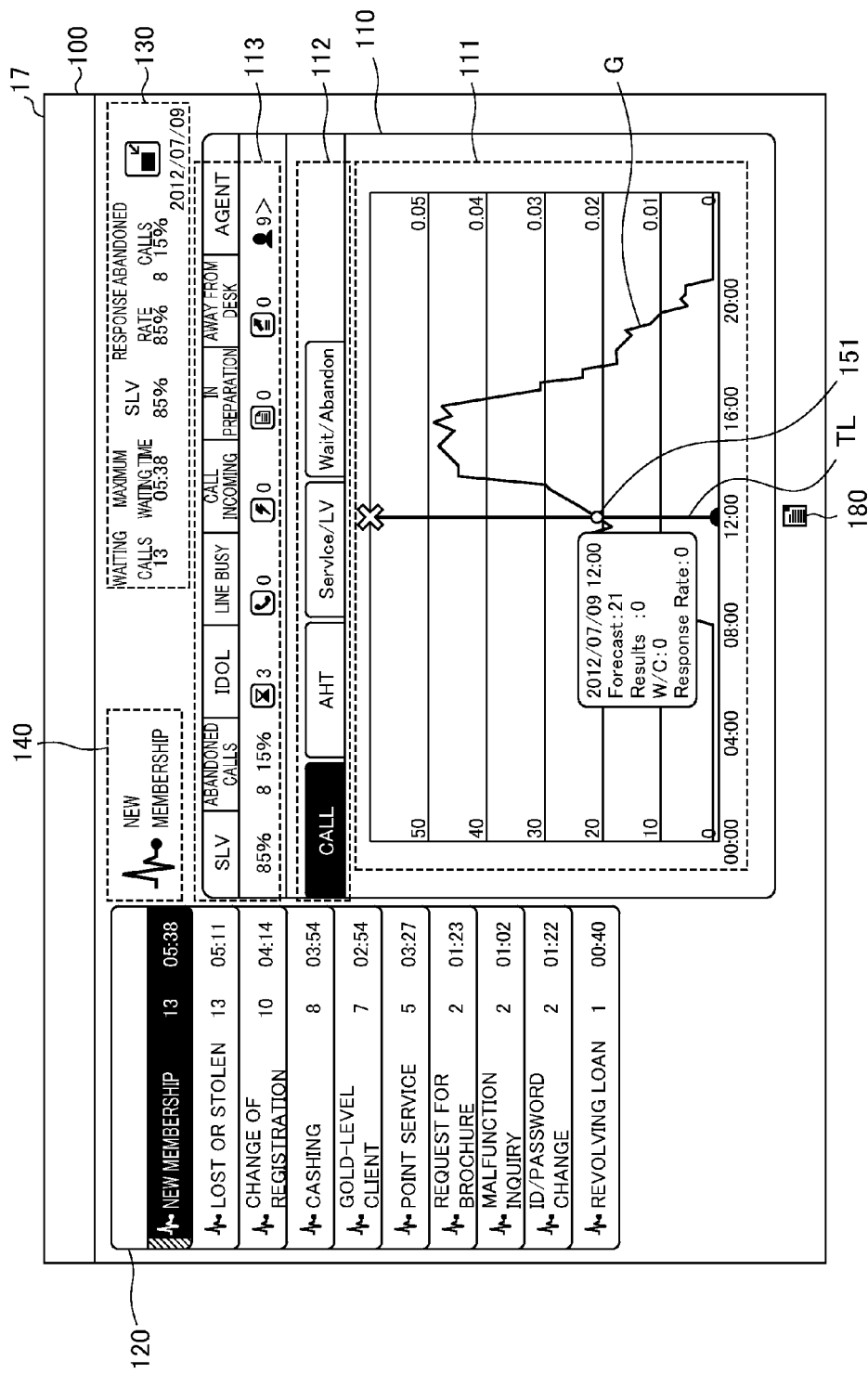
FIG. 7 is a diagram showing another example of a synthesized image that is displayed under control of the display controller shown in FIG. 2.
Figure 8:
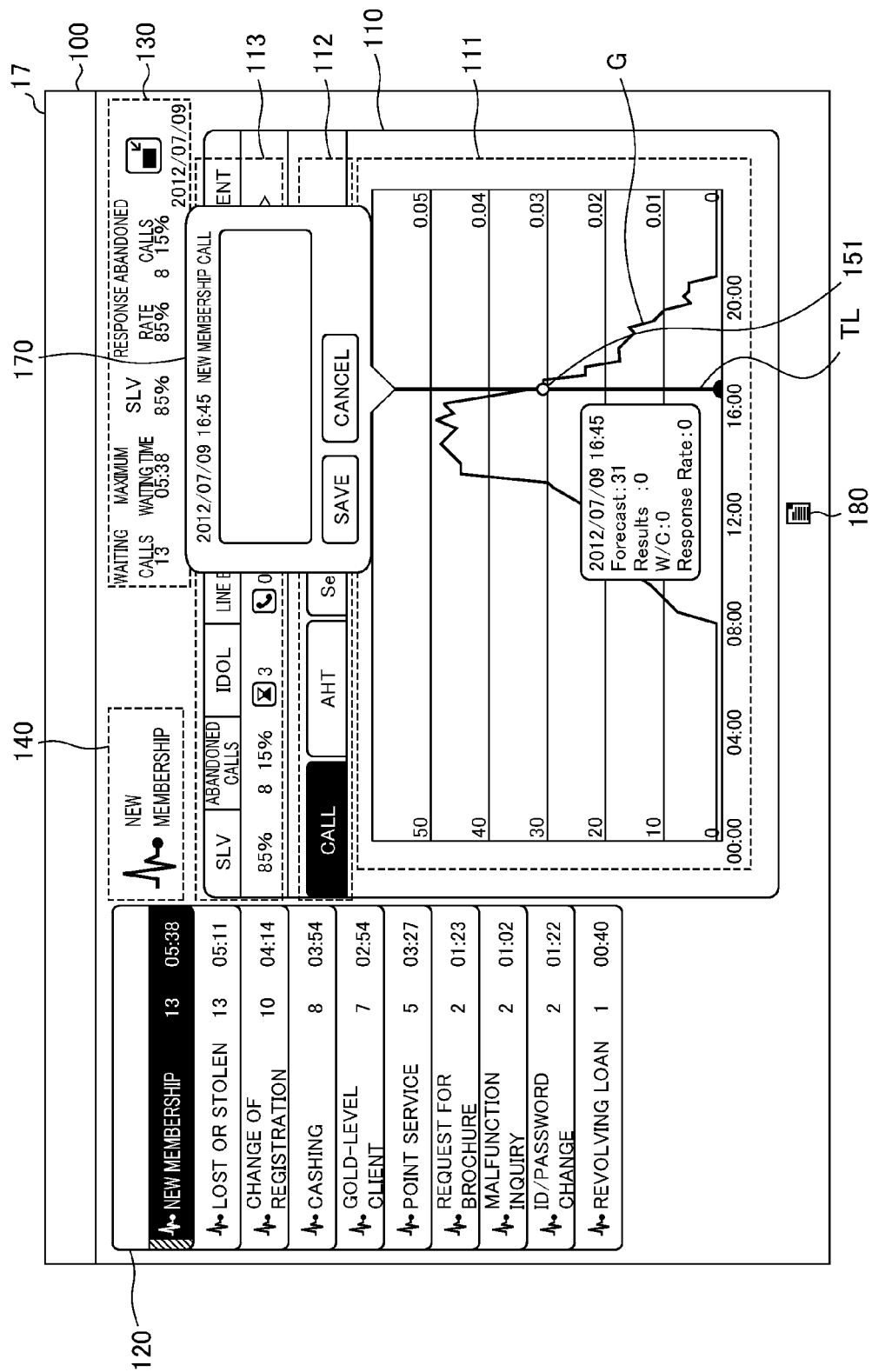
FIG. 8 is a diagram showing still another example of a synthesized image that is displayed under control of the display controller shown in FIG. 2.

FIGS. 6 to 8 show various examples of synthesized images displayed on the display unit 17 under the control of the display control unit 46.

When a predetermined operation is performed for the input unit 16 in a state where the synthesized image shown in FIG. 4 (3) is displayed, the line image generation unit 44 generates data of a GUI (Graphical User Interface) image for inputting predetermined information regarding the time indicated by the timeline TL (the time "12:00" in the example shown in FIG. 4). The GUI image is hereinafter referred to as "time information input image", and the information to be input into the time information input image is hereinafter referred to as "time information".

FIG. 6 shows an example of a synthesized image obtained by further combining a time information input image 170 with the graph image 111a and the line image 111b.

Predetermined information, which the user has input from the input unit 16 (FIG. 2), regarding the time indicated by the timeline TL (the time "12:00" in the example shown in FIG. 6), is displayed in the time information input image 170; and character information of "communication required" is displayed in the example shown in FIG. 6. Although the position of displaying the time information input image 170 (synthesis position) is arbitrary, the position thereof in the vicinity of the timeline TL as in the example shown in FIG. 6 allows the user to easily visually observe the relationship thereof with the timeline TL, which is therefore convenient for the user.

FIG. 7 shows an example of a synthesized image after inputting time information.

When an input of the time information regarding the time indicated by the timeline TL (the time "12:00" in the example shown in FIG. 7) is completed, a predetermined file including the time information of the time (the time "12:00" in the example shown in FIG. 7), i.e. an input content of the time information input image 170 in FIG. 6, is generated and stored into the storage unit 18 (FIG. 1), and the displaying of the time information input image 170 is cancelled.

As shown in FIG. 8, a file icon 180, which indicates that the file of the time information exists, is combined with the graph image 111a and the line image 111b, and a resulting synthesized image is displayed. Although the position of displaying the file icon 180 (synthesis position) is arbitrary, the position thereof in the vicinity of the associated time in the time axis as in the example shown in FIG. 7 (the time "12:00" in the example shown in FIG. 7) allows the user to easily visually observe the relationship thereof with the timeline TL, and therefore is convenient for the user.

Here, when the user operates the input unit 16 to click the file icon 180, the synthesized image shown in FIG. 6 is displayed again. As a result, the user visually observes the time information input image 170 that is displayed again, and the user can easily confirm the time information associated with the file icon 180 that is clicked.

Furthermore, when the user operates the input unit 16 to select a coordinate corresponding to time "16:45" that is different from the time "12:00", another line image including the timeline TL indicating the different time "16:45" is generated, and a synthesized image combining the line image with the graph image 111a is displayed.

In this case as well, the user can operate the input unit 16 to cause the display controller 1 to store the time information (reminder, etc.) regarding the time t indicated by the timeline TL (the time "16:45" in the example shown in FIG. 8).

In this case, the time information input image 170 for inputting time information regarding the time "16:45" is combined with the line image including the timeline TL indicating the time "16:45" and the graph image 111a, and a synthesized image as shown in FIG. 8 is displayed. Since subsequent operations by the user and subsequent processing by the display controller 1 are similar to those described above with reference to FIGS. 6 and 7, descriptions thereof are omitted herein.

The file icon 180 indicating the file including the time information of the time "12:00" also continues to be displayed as long as the file continues to exist. In other words, although not illustrated, in a case in which a file including the time information of the time "16:45" is further generated, two file icons are concurrently displayed, i.e. the file icon 180 indicating the file including the time information of the time "12:00", and a file icon indicating the file including the time information of the time "16:45".

Figure 9:
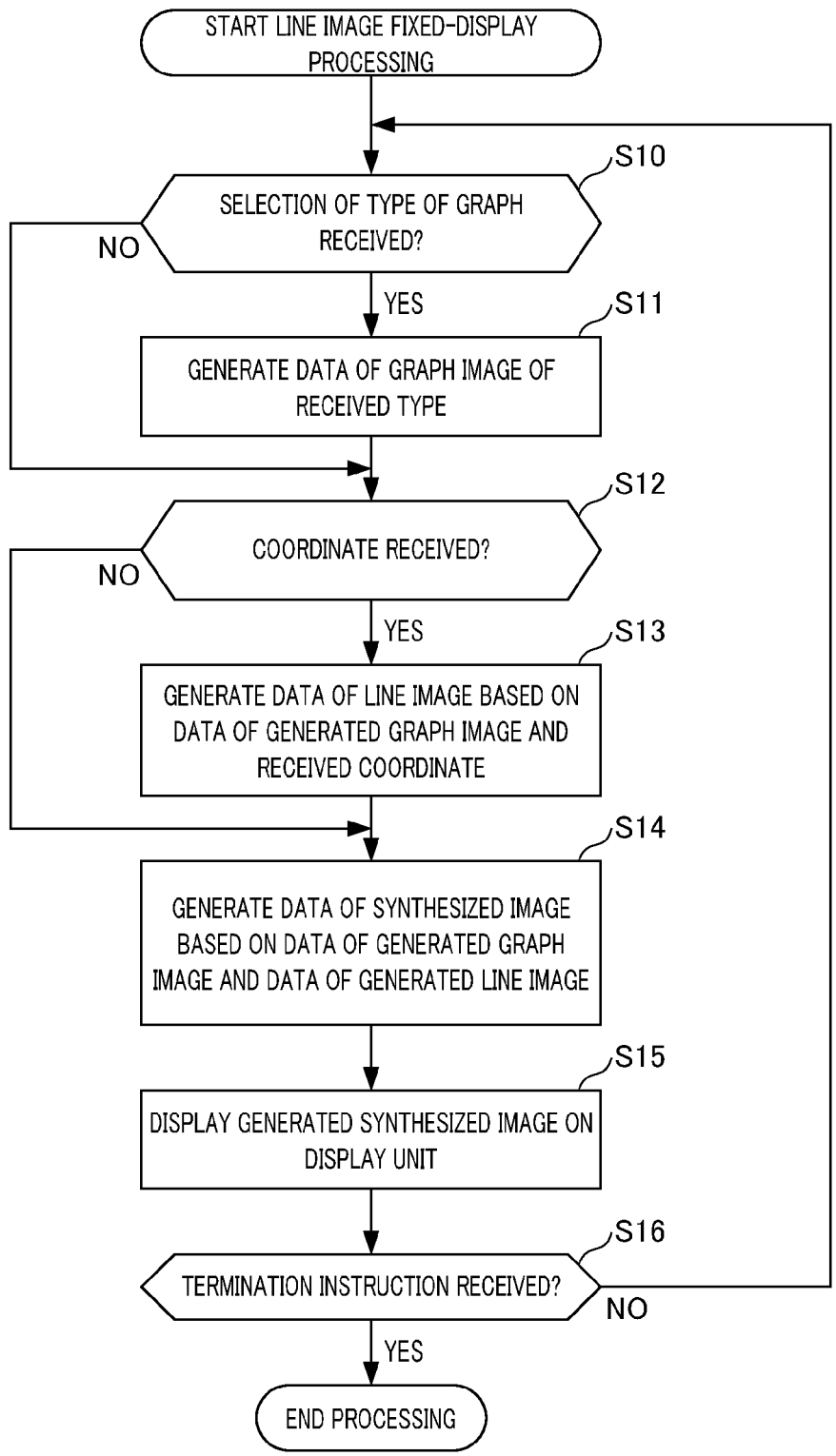
FIG. 9 is a flowchart illustrating a flow of the line image fixed-display processing executed by the display controller of FIG. 1 having the functional configuration shown in FIG. 2.

Referring now to FIG. 9, descriptions are provided for the line image fixed-display processing that is executed by the display controller 1 having the functional configuration shown in FIG. 2.

FIG. 9 is a flowchart illustrating a flow of the line image fixed-display processing executed by the display controller 1 of FIG. 1 having the functional configuration shown in FIG. 2.

The line image fixed-display processing is initiated when the user operates the input unit 16 to perform a predetermined operation to initiate the line image fixed-display processing, in which the following processing is executed.

In Step S10, the graph selection receiving unit 41 determines whether selection of graph type is received from the user. In a case in which selection of a graph type has not been received, the determination in Step S10 is NO, and the processing advances to Step S12. Processing in and after Step S12 will be described later. In a case in which selection of a graph type is received, the determination in Step S10 is YES, and the processing advances to Step S11.

In Step S11, the graph image generation unit 42 generates data of a graph image of the type received by the graph selection receiving unit 41.

In Step S12, the coordinate receiving unit 43 determines whether a coordinate is received from the user. In a case in which a coordinate is not received, the determination in Step S12 is NO, and the processing advances to Step S14. Processing in and after Step S14 will be described later. In a case in which a coordinate is received, the determination in Step S12 is YES, and the processing advances to Step S13.

In Step S13, the line image generation unit 44 generates data of the line image 111b, based on data of the graph image 111a generated in Step S11 (more precisely, data of axes that define a space in which a graph is rendered), and the coordinate received in Step S12.

In Step S14, the image synthesis unit 45 generates data of the synthesized image 111c, based on the data of the graph image 111a generated in Step S11, and the data of the line image 111b generated in Step S13. In a case in which a coordinate is not received in Step S12, the image synthesis unit 45 generates data of the synthesized image 111c, based on the data of the graph image 111a newly generated in Step S11, and the data of line image 111b previously generated in Step S13.

In Step S15, the display control unit 46 controls the display unit 17 to display the synthesized image 111c that was generated as data in Step S14.

In Step S16, the graph selection receiving unit 41 determines whether a termination instruction for the line image fixed-display processing is received. In a case in which a termination instruction is not received, the determination in Step S15 is NO, and the processing returns to Step S10. In other words, the processing in Steps S10 to S16 is repeated until a termination instruction is received. In a case in which a termination instruction is received, the determination in Step S16 is YES, and the line image fixed-display processing is terminated.

As described above, the display controller 1 includes the graph selection receiving unit 41, the graph image generation unit 42, the coordinate receiving unit 43, the line image generation unit 44, the image synthesis unit 45, and the display control unit 46. The graph selection receiving unit 41 receives a single type of graph that is selected as a display object from a plurality of types of graphs by the user operation. The graph image generation unit 42 constructs a two-dimensional space defined by at least two axes, and generates the image as data of the graph image 111a in the space, in which a graph G of the type received by the graph selection receiving unit 41 is rendered. A coordinate receiving unit 43 receives an arbitrary coordinate in an arbitrary timeline TL designated by a user operation, among coordinates in at least two axes defining the space. The line image generation unit 44 acquires information of the space from the graph image generation unit 42, and generates data of the line image 111b in the space, the line image 111b at least passing through the coordinate in the timeline TL received by the coordinate receiving unit 43. An image synthesis unit 45 generates data of the synthesized image 111c by combining the data of the graph image 111a with the data of the line image 111b in which the line is rendered. A display control unit 46 controls a display unit 17 to display the synthesized image 111c.

As a result, even in a case in which the type of graph is changed, the data in the corresponding coordinate in each graph can be easily compared by displaying the information corresponding to the coordinate desired by the user.

Furthermore, the image synthesis unit 45 of the display controller 1 generates data of the synthesized image 111c so as to include information of the intersections 151, 152 and 153 of the timeline TL with the graph G, as well as the intersection information 160.

As a result, even in a case in which the type of graph G is changed, the data in the corresponding coordinate in each graph G can be clearly grasped, and the data can be easily compared with each other.

Furthermore, the graph image generation unit 42 of the display controller 1 generates data of the graph image 111a having the plurality of graphs G2a and G2b. The image synthesis unit 45 generates data of the synthesized image so as to include information of the intersections 151a and 151b of the timeline TL with the plurality of graphs G2a and G2b.

As a result, even in a case in which a plurality of graphs G are provided, the data in the corresponding coordinate in each graph G can be clearly grasped, and the data can be easily compared with each other.

Furthermore, the axis received by the coordinate receiving unit 43 of the display controller 1 is a time axis, and the coordinate received by the coordinate receiving unit 43 is time.

As a result, even in a case in which the graph is changed, information of a time axis desired by the user can be displayed. As a result, the user can easily compare the data in the corresponding time axis in each graph.

Furthermore, the image synthesis unit 45 of the display controller 1 generates data of the synthesized image 111c so as to include the time information input image 170 corresponding to the coordinate received by the coordinate receiving unit 43.

As a result, the information corresponding to each time in the graph G can be easily grasped.

Here, descriptions are provided for some examples of a display image displayed on the display unit 17 with reference to FIGS. 10 to 23.

Figure 10:
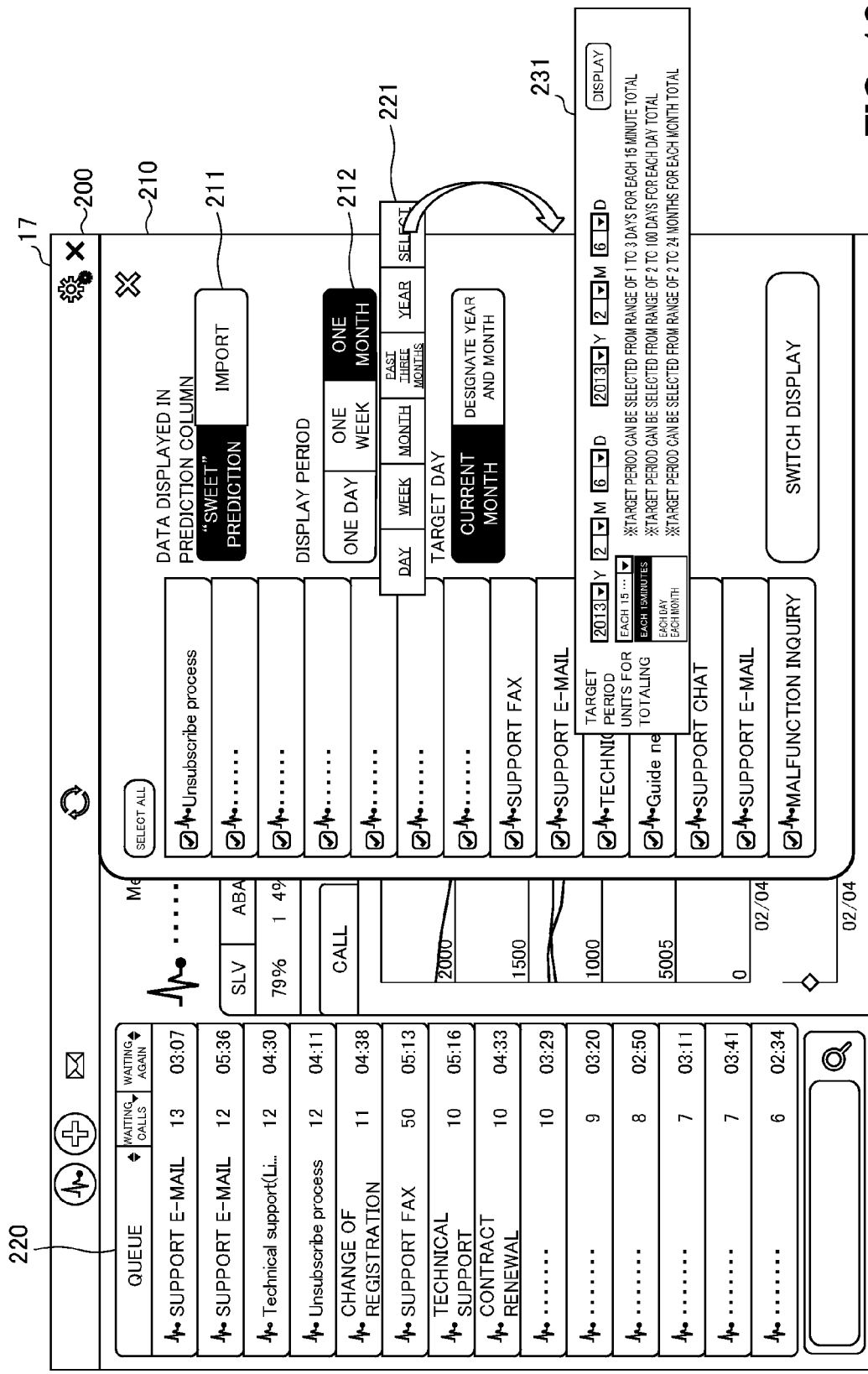
FIG. 10 is a diagram showing an example of an image for selecting a range of display data, in which the image is displayed under control of the display controller shown in FIG. 2.

FIG. 10 shows an example of an image for selecting a range of display data, in which the image is displayed under control of the display controller 1.

As shown in FIG. 10, a display image 200 is configured to include a main display area 210 and a queue display area 220.

The main display area 210 is configured to include a prediction column selection area 211 and a display period selection area 212.

The type of data selected to be displayed in the prediction column by the user operation from among a plurality of types of data is displayed in the prediction column selection area 211. The type of period selected as a display period by the user operation from among a plurality of types of display periods is displayed in the display period selection area 212.

Here, when an arbitrary display period is selected by the user operation from among the plurality of display periods displayed in the display period selection area 212, a first detailed window 221 is displayed in the main display area 210. A plurality of unit periods for further narrowing down the selected display period are displayed in the first detailed window 221. In the example shown in FIG. 10, a plurality of unit periods such as "day", "week", "month", "past three months", "year" and "selection" are displayed in the first detailed window 221. Here, "selection" enables the user to select an arbitrary unit period. Therefore, when "selection" is selected by the user's further operation from among the plurality of unit periods displayed in the first detailed window 221, a second detailed window 231 is displayed in the main display area 210. A period for narrowing down the target unit period per day is displayed in the second detailed window 231.

Information of a plurality of queues is displayed in a queue display area 220.

Figure 11:
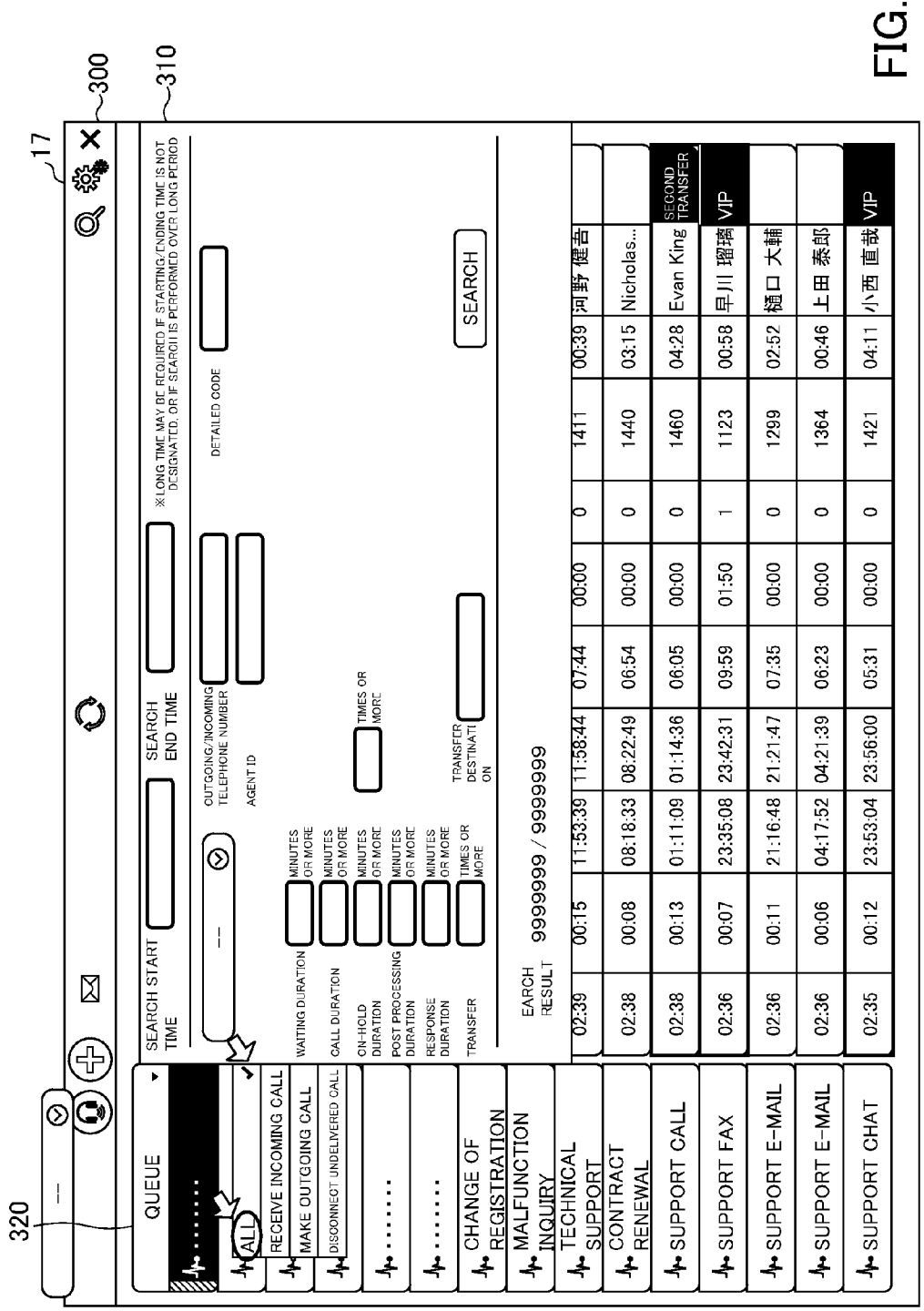
FIG. 11 is a diagram showing an example of an image for inputting search conditions for searching for call traces, the image also displaying results of the search, in which the image is displayed under the control of the display controller shown in FIG. 2.

FIG. 11 shows an example of an image for inputting search conditions for searching for call traces, the image also displaying results of the search, with the image being displayed under the control of the display controller 1.

As shown in FIG. 11, a display image 300 is configured to include a main display area 310 and a queue display area 320.

Information of search conditions, which were input for searching for call traces by the user operation, and information of results thereof are displayed in the main display area 310.

Information of a plurality of queues is displayed in the queue display area 320.

Figure 12:
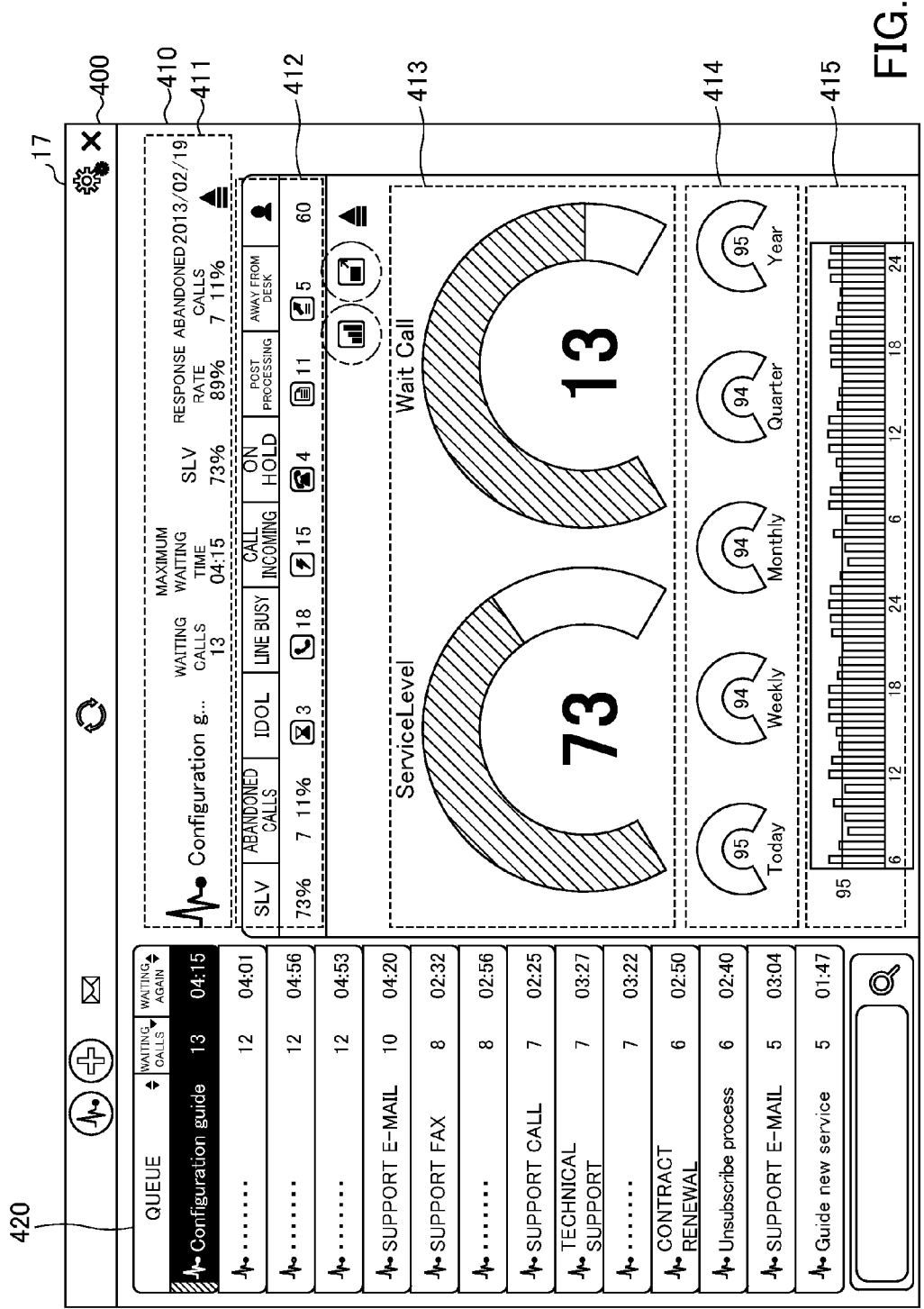
FIG. 12 is a diagram showing an example of an image indicating operating statuses, etc. of various items, in which the image is displayed under the control of the display controller shown in FIG. 2.
Figure 13:
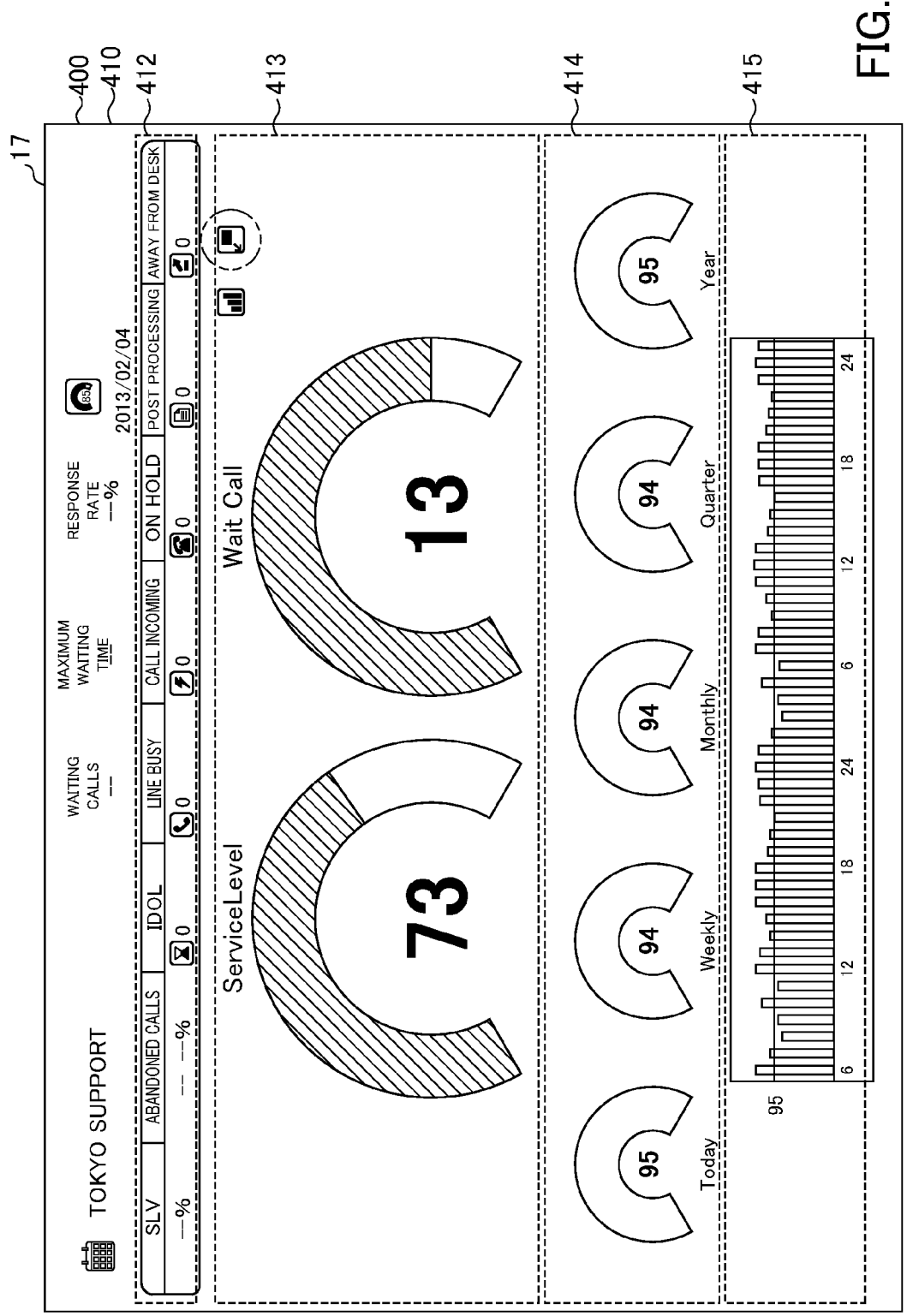
FIG. 13 is a diagram showing an example of an image indicating operating statuses, etc. of various items, in which the image is displayed under the control of the display controller shown in FIG. 2.

FIGS. 12 and 13 each show an example of an image indicating operating statuses, etc. of various items, in which the image is displayed under the control of the display controller 1.

As shown in FIGS. 12 and 13, a display image 400 is configured to include a main display area 410 and a queue display area 420.

The main display area 410 is configured to include an individual/selected information display area 411, an icon information display area 412, a tachometer display area 413, a detailed tachometer display area 414, and a time display area 415.

Individual information corresponding to a graph image (which may be a synthesized image) displayed in the tachometer display area 413 is displayed in the individual/selected information display area 411.

Individual information corresponding to the tachometers displayed in the tachometer display area 413 is displayed together with a plurality of icons in the icon information display area 412.

Detailed information to be confirmed by the user is displayed in the tachometer display area 413, and a graph emulating a predetermined type of tachometer is displayed in the tachometer display area 413 in the present embodiment.

For example, in a state of displaying the display image 100 as shown in FIG. 3, when the user operates the input unit 16 to select a predetermined type of time series graph G in the graph display area 111, an image as shown in FIG. 12 is displayed in the tachometer display area 413 corresponding to the graph display area 111. In other words, a pair of "semi-circle graphs" (each graph emulating a so-called tachometer, hereinafter referred to as "tachometer") corresponding to the selected graph G is displayed by a designated number in a designated location of the area. In a state where the pair of tachometers is displayed, when an icon above the display of "Wait Call" is selected (tapped), the original graph G is displayed or cancelled. When an icon on the right side thereof in the diagram is selected (tapped), an image of an enlarged tachometer is displayed as shown in FIG. 13.

The graph displayed in the tachometer display area 413 is further divided into predetermined time units to be displayed in the detailed tachometer display area 414.

The graph displayed in the tachometer display area 413 is further divided into each time to be displayed in the time display area 415.

FIG. 14 shows an aspect of changing a relative size of the graph display area within the display image that is displayed under the control of the display controller 1. In other words, a predetermined type of time series graph G is displayed in an enlarged manner.

Figure 14A:
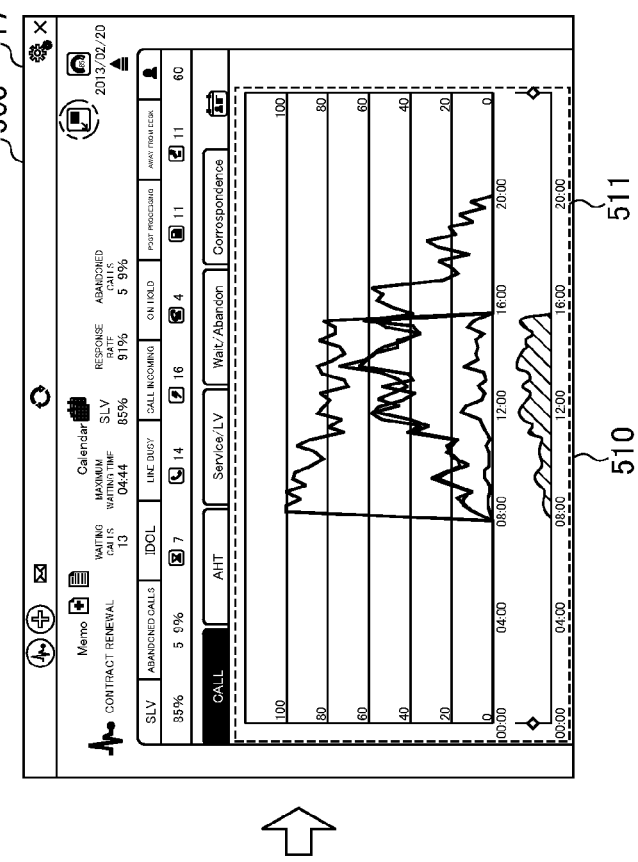
FIG. 14A and FIG. 14B are diagrams showing an aspect of changing the relative size of a graph display area within a display image that is displayed under the control of the display controller shown in FIG. 2.
Figure 14B:
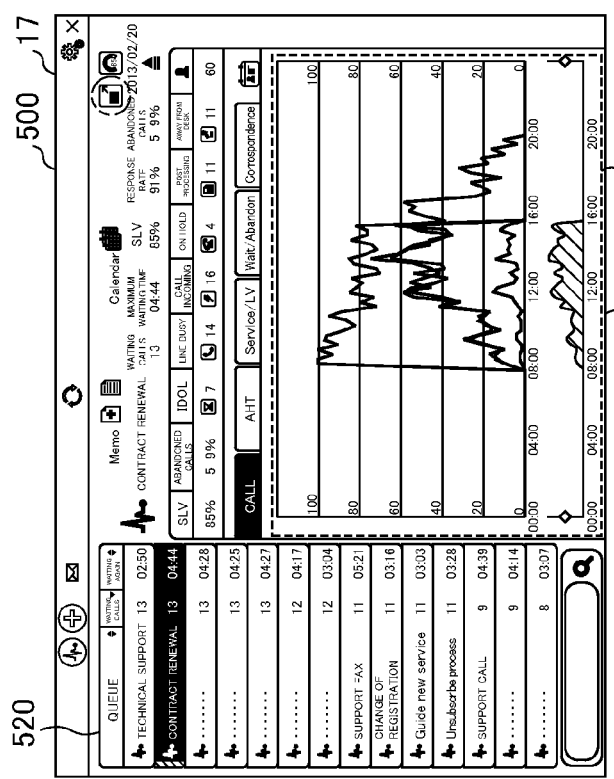

As shown in FIGS. 14A and 14B, a display image 500 is configured to include a main display area 510 and a queue display area 520.

The main display area 510 is configured to include a graph display area 511. A predetermined type of time series graph is displayed in the graph display area 511.

Information of a plurality of queues is displayed in the queue display area 520.

For example, in a state of displaying the display image 500 as shown in FIG. 14A, when the user operates the input unit 16 to select a predetermined type of time series graph, the time series graph is displayed in the graph display area 511. When an icon on the right side thereof in the diagram is selected (tapped), an image of the time series graph is displayed in an enlarged manner as shown in FIG. 14B.

Figure 15:
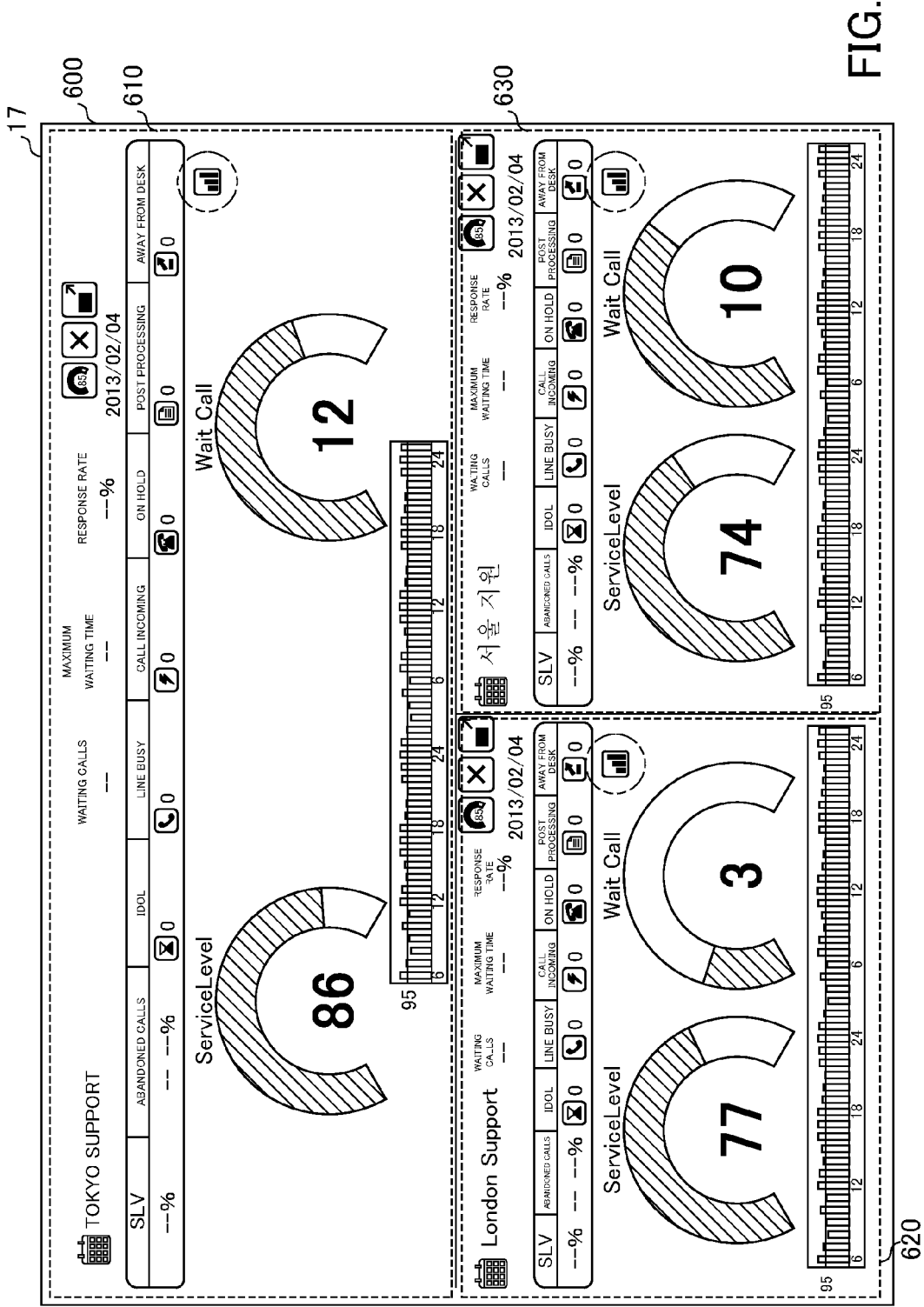
FIG. 15 is a diagram showing an example of an image indicating operating statuses, etc. of various items, in which the image is displayed under the control of the display controller shown in FIG. 2, and the example is different from the examples in FIGS. 12 and 13.

FIG. 15 shows an example of an image indicating operating statuses, etc. of various items, in which the image is displayed under the control of the display controller 1, and the example is different from the examples in FIGS. 12 and 13.

As shown in FIG. 15, the display controller 1 can display a pair of tachometers for each of a plurality of queues (three queues in the example shown in FIG. 15) in the display image 600.

As shown in FIG. 15, the display image 600 is configured to include a first display area 610, a second display area 620, and a third display area 630. Pairs of tachometers respectively corresponding to queues in different regions are displayed in the first display area 610, the second display area 620, and the third display area 630, respectively.

Figure 16:
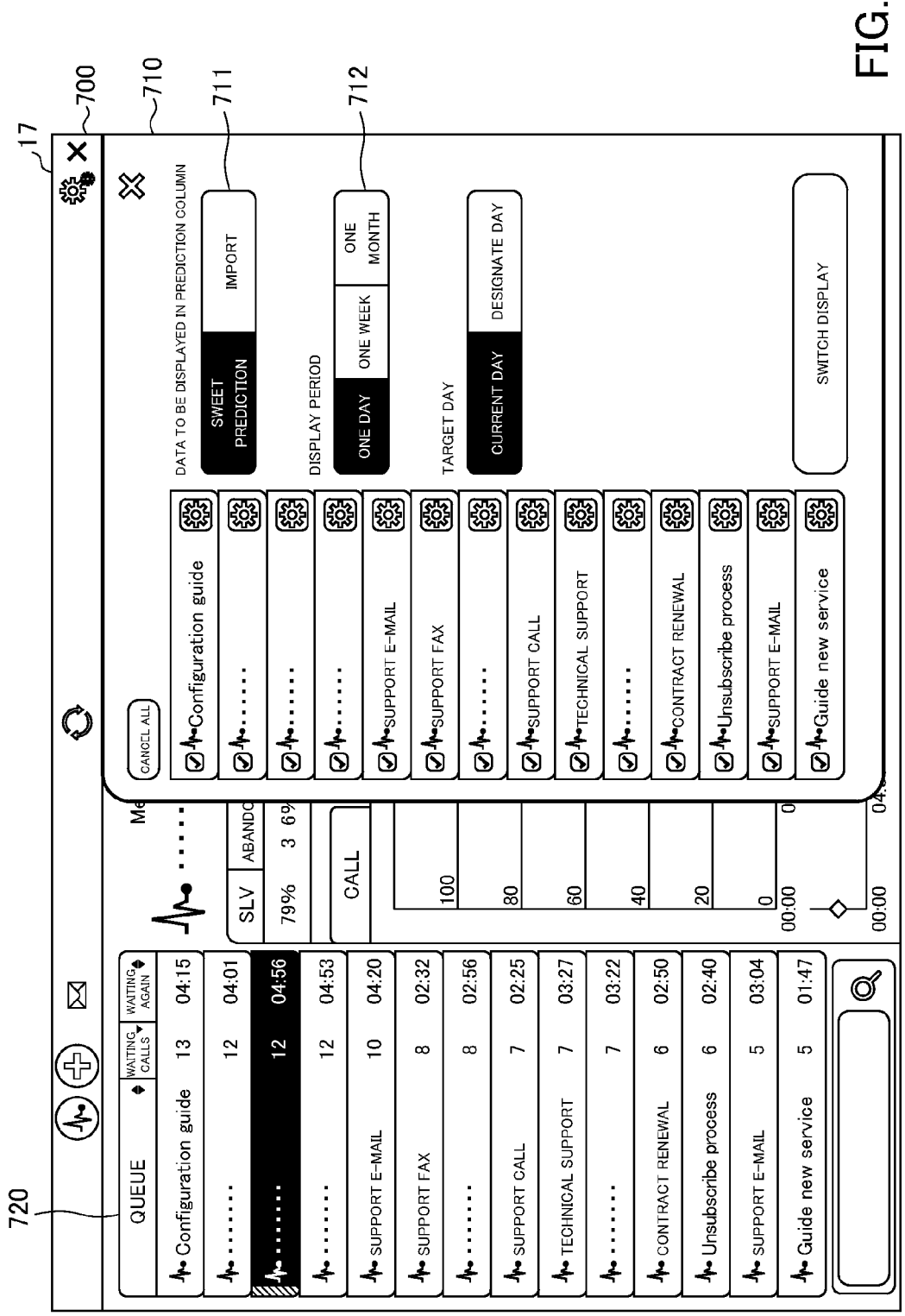
FIG. 16 is a diagram showing an example of an image for setting various items for each queue in the image of FIG. 15, in which the image is displayed under the control of the display controller shown in FIG. 2.

FIG. 16 is an example of an image for setting various items for each queue in the image (tachometers) of FIG. 15, in which the image is displayed under the control of the display controller 1.

As shown in FIG. 16, the display controller 1 can display information for setting various items for each queue in a display image 700.

As shown in FIG. 16, the display image 700 is configured to include a main display area 710 and a queue display area 720.

The main display area 710 is configured to include a prediction column selection area 711 and a display period selection area 712.

The type of data selected to be displayed in the prediction column by the user operation from among a plurality of types of data is displayed in the prediction column selection area 711. The type of period selected as a display period by the user operation from among a plurality of types of display periods is displayed in the display period selection area 712.

Information of a plurality of queues is displayed in the queue display area 720.

Figure 17:
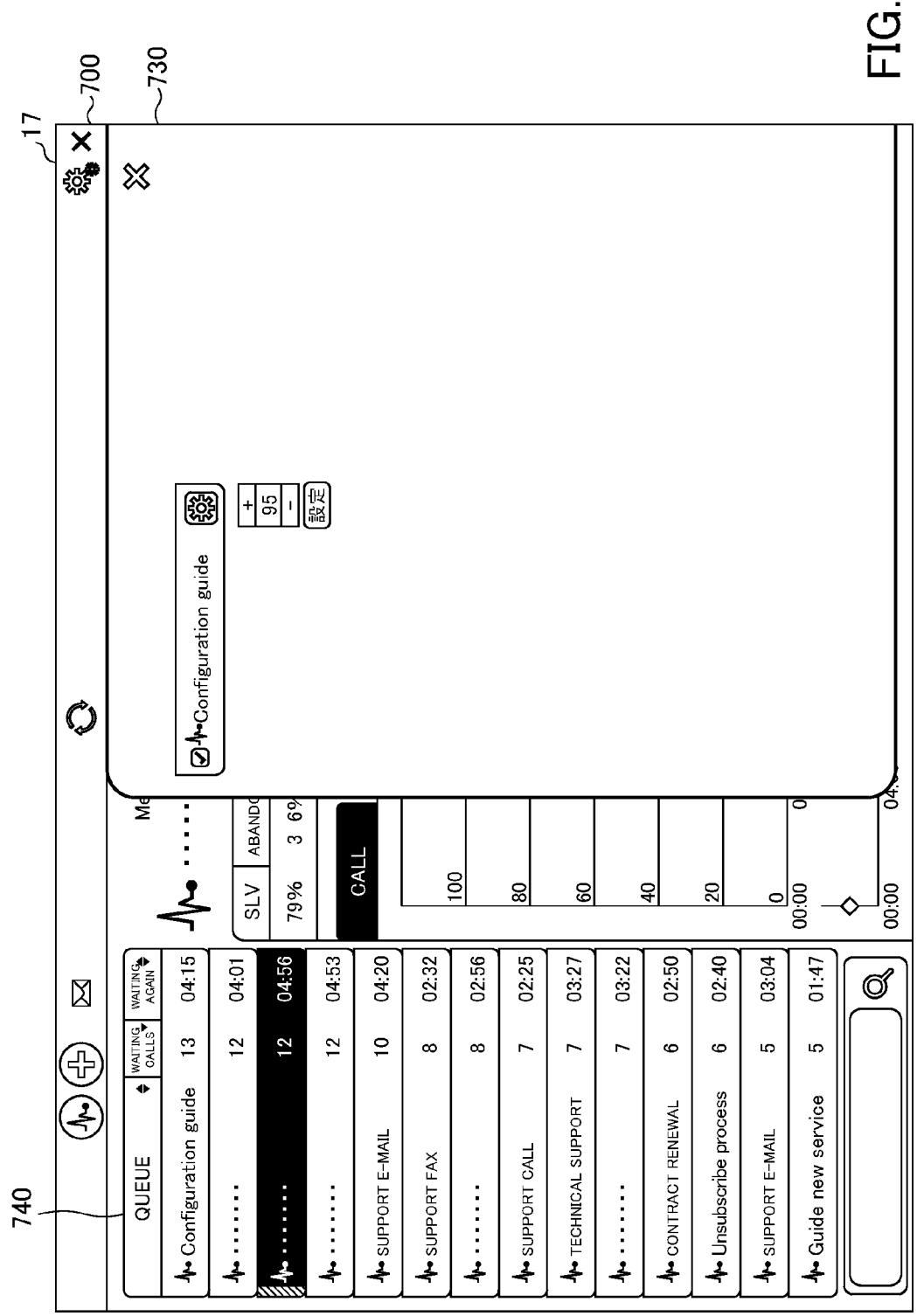
FIG. 17 is a diagram showing an example of an image for setting a service level for each queue in the image of FIG. 15, in which the image is displayed under the control of the display controller shown in FIG. 2.

FIG. 17 is an example of an image for setting a service level for each queue in the image (tachometers) of FIG. 15, in which the image is displayed under the control of the display controller 1.

As shown in FIG. 17, the display controller 1 can display information for setting a service level for each queue for the image (tachometers) of FIG. 15 in the display image 700.

As shown in FIG. 17, the display image 700 is configured to include a main display area 730 and a queue display area 740.

An item for displaying predetermined information for setting a service level for each queue is displayed in the main display area 730. In the present embodiment, "95" is set as a default value corresponding to Configuration Guide. This value can be arbitrarily set by the user operating the input unit 16.

Information of a plurality of queues is displayed in the queue display area 740.

Figure 18:
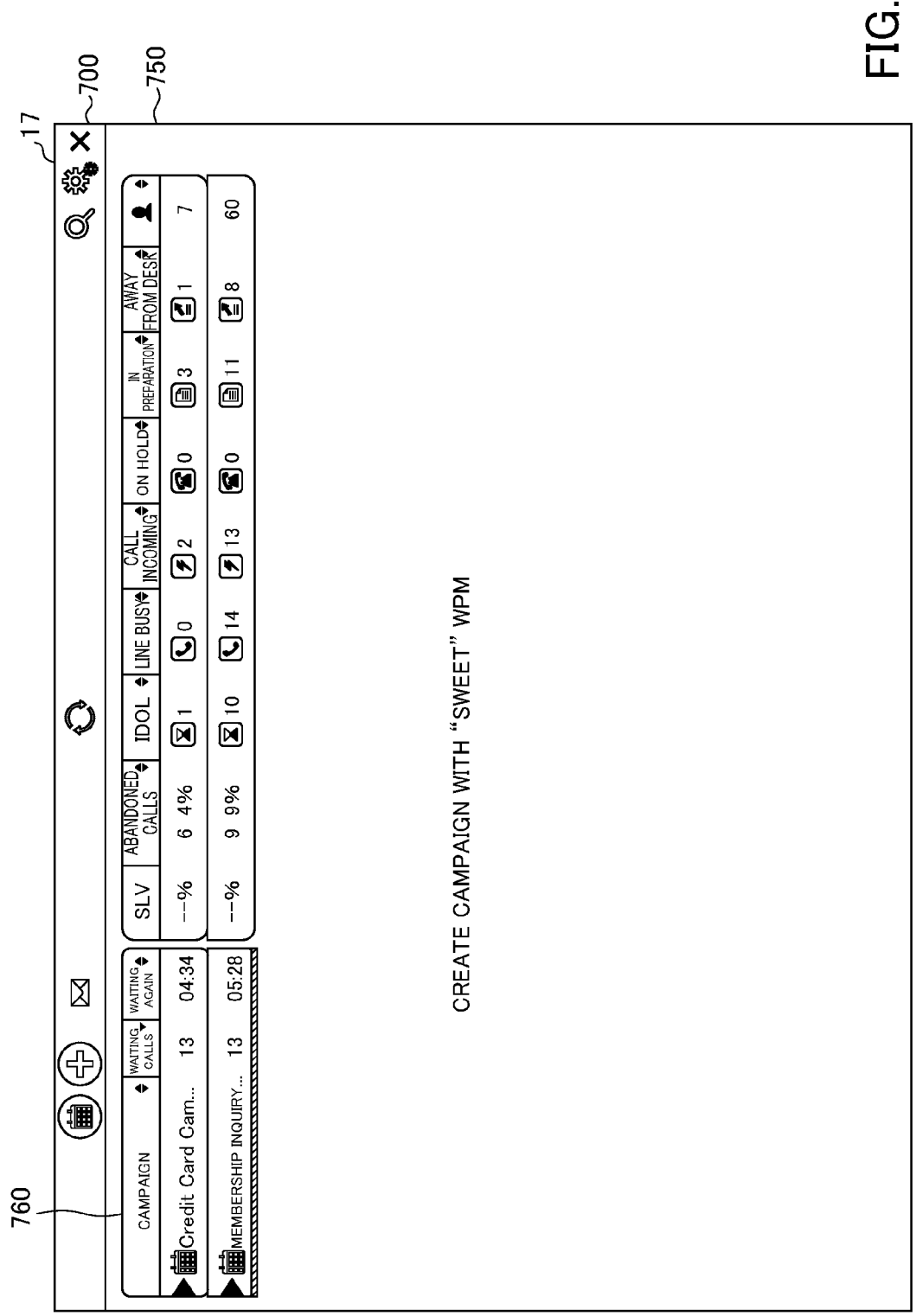
FIG. 18 is a diagram showing an example of an image including WFM access buttons from campaigns, in which the image is displayed under the control of the display controller shown in FIG. 2.

FIG. 18 is an example of an image including WFM access buttons from campaigns, in which the image is displayed under the control of the display controller 1.

As shown in FIG. 18, the display controller 1 can display various buttons including WFM access buttons from campaigns in the display image 700.

As shown in FIG. 18, the display image 700 is configured to include a main display area 750 and a campaign display area 760. Various buttons corresponding to various campaigns displayed in the campaign display area 760 are displayed in the main display area 750. When there is no campaign, as shown in FIG. 18, the display controller 1 can display a message such as "create a campaign with Sweet WPM" in a column below the campaign display area 760.

Information of a plurality of campaigns is displayed in the campaign display area 760.

Figure 19:
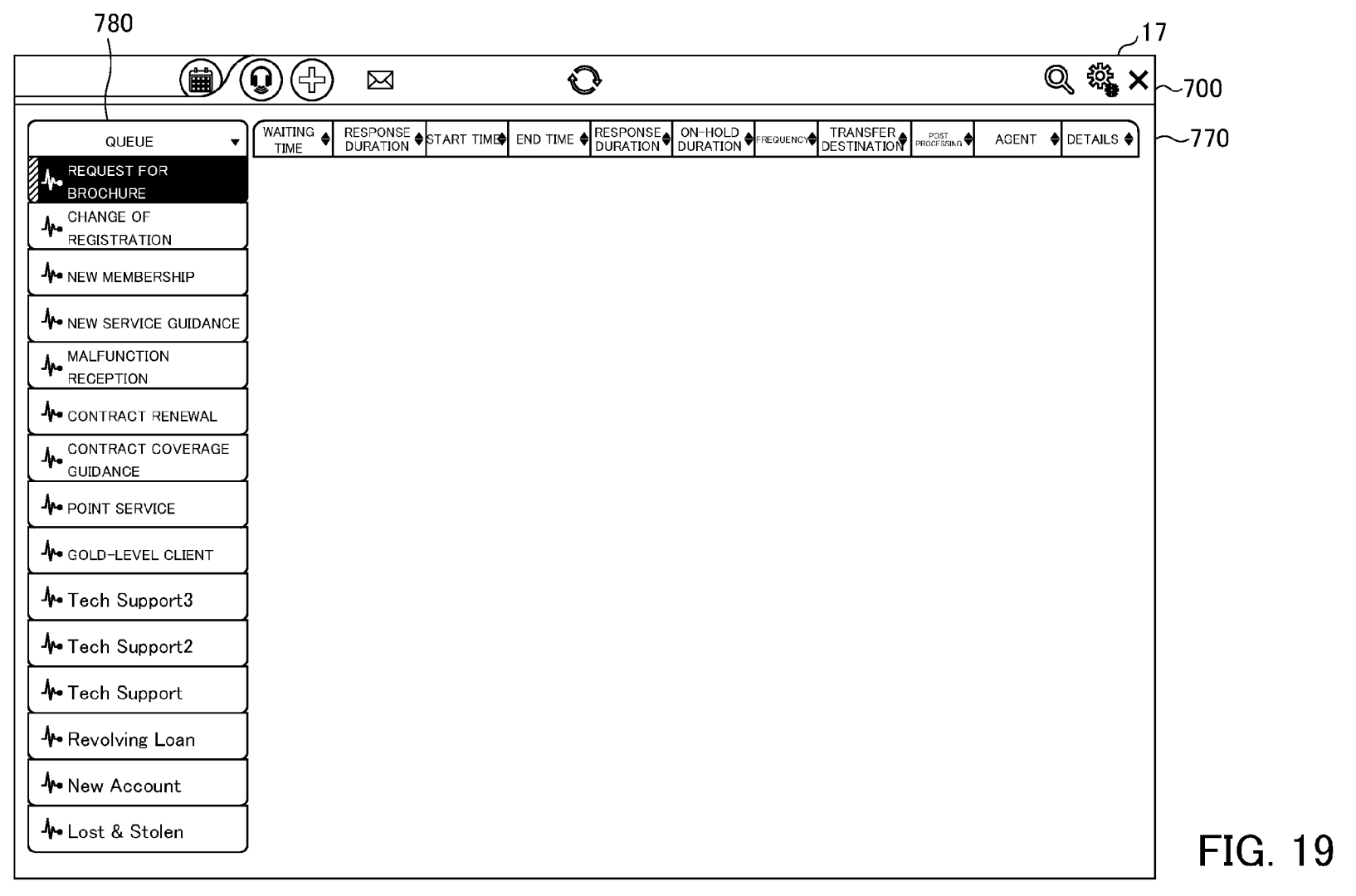

FIG. 19 is an example of an image for determining a license of a call trace, in which the image is displayed under the control of the display controller 1.

As shown in FIG. 19, the display controller 1 can display a variety of information for determining the license of a call trace in the display image 700.

As shown in FIG. 19, the display image 700 is configured to include a main display area 770 and a queue display area 780.

A variety of information for determining the license of a call trace is displayed in the main display area 770.

Information of a plurality of queues is displayed in the queue display area 780.

FIG. 20 shows an example of a synthesized image capable of indicating a response rate and a service level).

As shown in FIG. 20, the display controller 1 can display a variety of information about a response rate and a service level in the display image 800.

As shown in FIG. 20, the display image 800 is configured to include a main display area 810 and a queue display area 820.

The main display area 810 is configured to include a graph display area 811 and a graph detailed information display area 812.

Detailed information to be confirmed by the user is displayed in the graph display area 811. In the present embodiment, a graph image including a predetermined type of time series graph is displayed, and a synthesized image combining the graph image with a line image (an image including a timeline indicating predetermined time) is displayed as necessary, in the graph display area 811. Furthermore, although not illustrated in FIG. 20, while the timeline is fixed, i.e. while the identical line image is employed, a synthesized image combining a different type of graph image may be displayed in the graph display area 811 as necessary.

Detailed information of the graph displayed in the graph display area 811 is displayed in the graph detailed information display area 812.

Information of a plurality of queues is displayed in the queue display area 820.

Figure 20A:
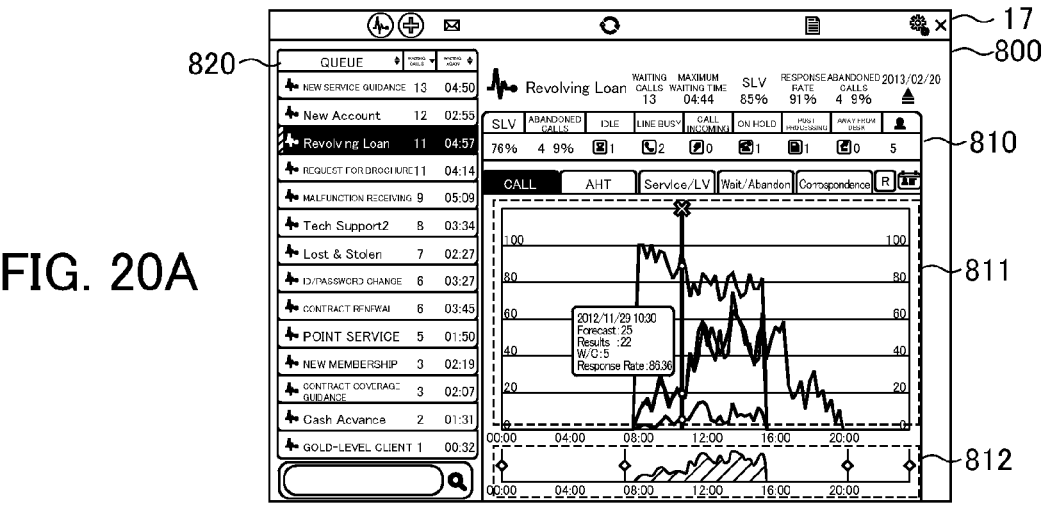
FIG. 20A, FIG. 20B, and FIG. 20C are diagrams showing an example of a synthesized image capable of indicating a response rate and a service level, in which the image is displayed under the control of the display controller shown in FIG. 2.
Figure 20B:
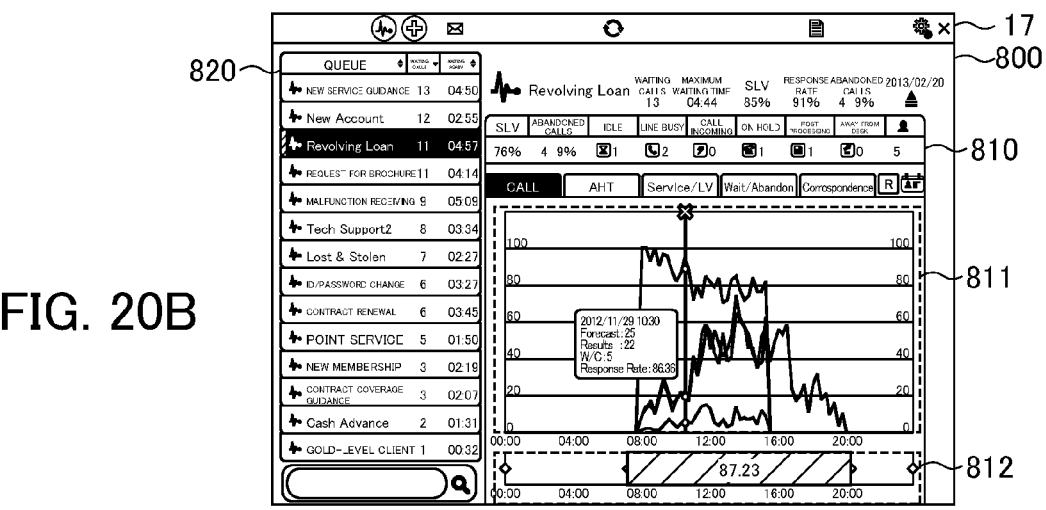

In a state of displaying the synthesized image (of combining a graph image with a line image) shown in FIG. 20A, when a button (icon) "R" is pressed by way of the input unit 16, a synthesized image as shown in FIG. 20B is displayed in the graph display area 811.

In the synthesized image shown in FIG. 20B, a response rate corresponding to the graph G displayed as the graph image, i.e. a response rate during a time zone designated by a band is displayed within the band.

In this regard, conventionally, a response rate has been displayed on a daily basis or as an instantaneous value, i.e. a value calculated at that moment.

In contrast, in the present embodiment, an arbitrary time zone is designated by the user operating the input unit 16, and a response rate within the designated time zone is calculated. In other words, the time zone for calculating a response rate is dynamically varied.

As a result, for example, the user can have the following usage.

For example, each call center has an important time zone (for example, a time zone in which telephone calls are concentrated) and an unimportant time zone (for example, a night time zone with a fewer telephone calls). The weighting of response rate per telephone call is different between the important time zone and the unimportant time zone.

In such a case, the response rate in an arbitrary time zone is calculated and displayed, in the present embodiment; therefore, the user can easily confirm the response rate while comparing the response rate in an unimportant time zone with the response rate in an important time zone, and can appropriately deal with the situation. For example, if the response rate is sufficient in an unimportant time zone, the user can adjust the working hours of an agent to assign the agent to an important time zone. As a result, an appropriate number of appropriate operators can be engaged in an important time zone in which the response rate should be improved, thereby allowing the service quality to be improved regardless of the number of staff being limited.

Figure 20C:
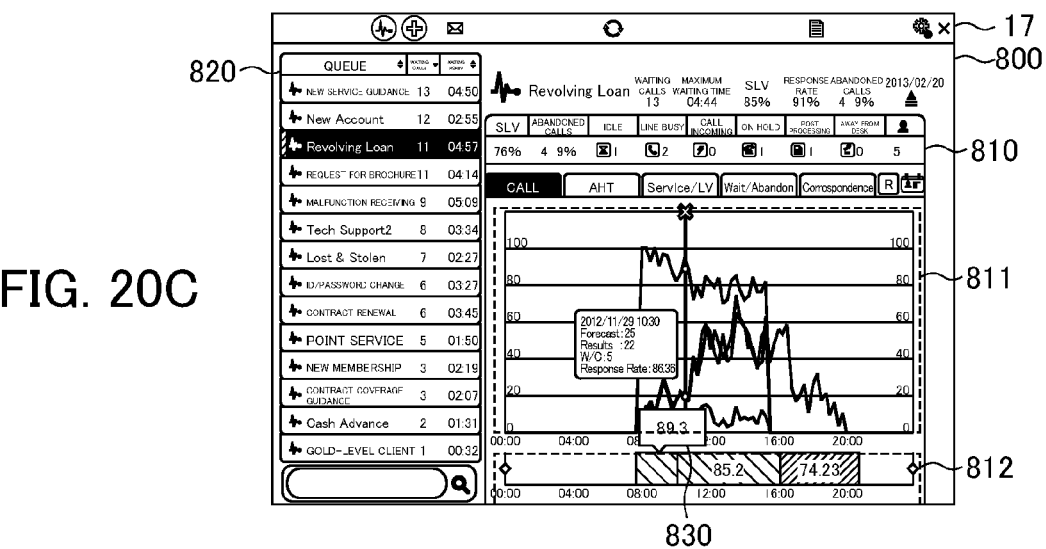

In a synthesized image shown in FIG. 20C, three bands respectively indicating three different time zones are displayed in the graph detailed information display area 812. Response rates in the designated time zones are displayed inside the three bands, respectively.

Here, a duration designated to the left band in the graph detailed information display area 812 in FIG. 20C is shorter than a predetermined duration (for example, shorter than three hours). Since it is difficult to display the response rate in the band in such a case, in the present embodiment, the response rate is not displayed by default, and when the band is selected, a popup window 830 is displayed to indicate the response rate as shown in FIG. 20C.

In the present embodiment, a service level can be individually set to each time zone for calculating the response rate. In this case, when the service level is set to a band, the manner of displaying the band can be changed in accordance with the value of the service level. For example, in the present embodiment, when the service level is set to the band, the band is displayed in orange in a state where the service level is below a predetermined threshold value, whereas the band is displayed in green in a state where the service level is above the predetermined threshold value. A band, to which a service level is not set, is also displayed in green.

Figure 21:
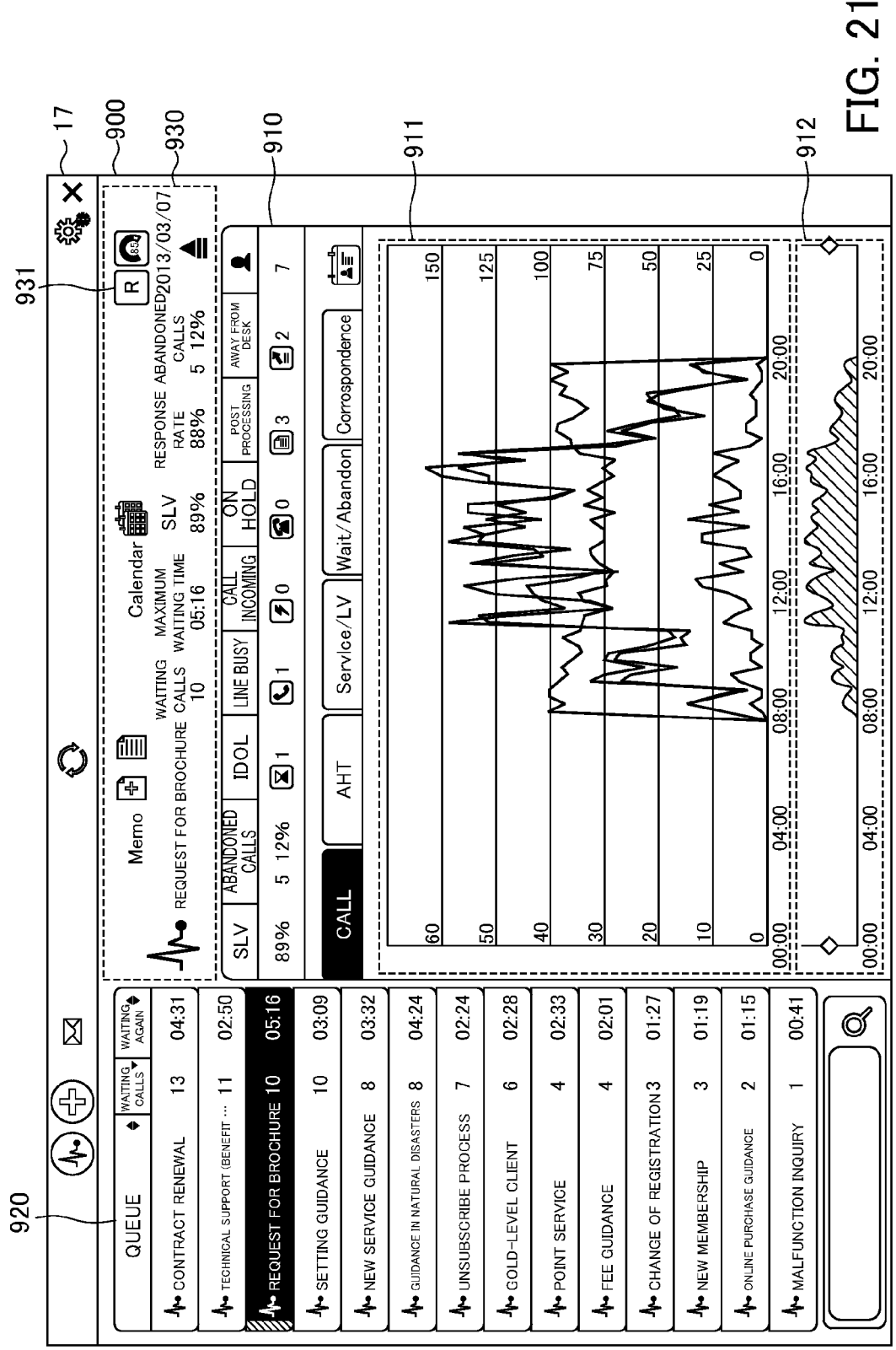
FIG. 21 is a diagram showing an example of a synthesized image capable of indicating a response rate and a service level, showing a screen transition up to where a synthesized image of an example different from the example in FIG. 20 is displayed under the control of the display controller shown in FIG. 2.
Figure 22:
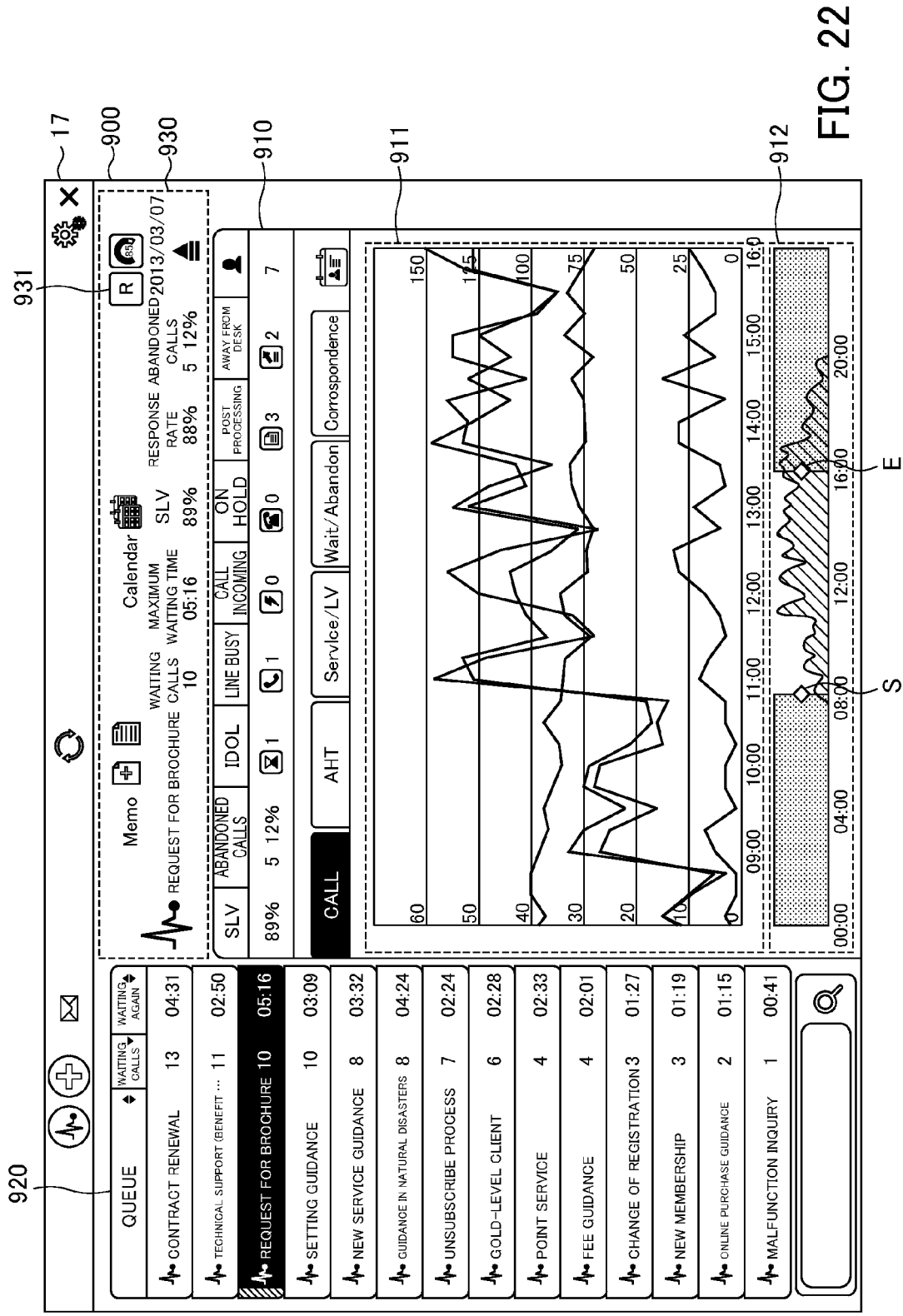
FIG. 22 is a diagram showing an example of a synthesized image capable of indicating a response rate and a service level, showing a screen transition up to where a synthesized image of an example different from the example in FIG. 20 is displayed under the control of the display controller shown in FIG. 2.

FIGS. 21 to 23 are diagrams each showing an example of a synthesized image capable of indicating a response rate and a service level, showing a screen transition up to where a synthesized image is displayed under the control of the display controller 1, in which the example is different from the example in FIG. 20

As shown in FIGS. 21 to 23, the display controller 1 can display a synthesized image of an example in a display image 900, in which the example is different from the example in FIG. 20.

As shown in FIGS. 21 to 23, the display image 900 is configured to include a main display area 910, a queue display area 920, and an individual information display area 930.

The main display area 910 is configured to include a graph display area 911 and a graph detailed information display area 912.

Detailed information to be confirmed by the user is displayed in the graph display area 911. In the present embodiment, a graph image including a predetermined type of time series graph is displayed, and a synthesized image combining the graph image with a line image (an image including a timeline indicating predetermined time) is displayed as necessary, in the graph display area 911. Furthermore, although not illustrated in FIGS. 21 to 23, while the timeline is fixed, i.e. while the identical line image is employed, a synthesized image combining a different type of graph image may be displayed in the graph display area 911 as necessary.

Detailed information of the graph displayed in the graph display area 911 is displayed in the graph detailed information display area 912.

Information of a plurality of queues is displayed in the queue display area 920.

Individual information corresponding to a graph image (which may be a synthesized image) displayed in the graph display area 911 is displayed in the individual information display area 930.

In the example shown in FIG. 21, in a state where a synthesized image (a synthesized image combining a graph image with a line image) is displayed, a button 931 (icon) "R" displayed in the individual information display area 930 is in a non-active state.

In this state, the user can arbitrarily set a range for obtaining a response rate by operating the input unit 16, as shown in FIG. 22. In the present embodiment, it is possible to freely set a starting point S (a point on the left in the area) and an ending point E (a point on the right in the area), which are displayed in the graph detailed information display area 912. A range between the starting point S and the ending point E, which are independently set, is set as a range for obtaining a response rate.

Subsequently, when the user presses the button 931 (icon) "R" displayed in the information display area 930 by operating the input unit 16, the display controller 1 activates the function of the button 931. As shown in FIG. 23, the display controller 1 calculates and immediately displays a response rate in the time zone that is set in the graph detailed information display area 912 (in the range between the starting point S and the ending point E). More specifically, an image including the designated range and the response rate (a value in the range) is combined with a graph image and a line image, and a resultant synthesized image is displayed in the graph detailed information display area 912.

Although not illustrated, the synthesized image shown in FIGS. 21 to 23 is also used for calculating and displaying a service level, in addition to a response rate. Switching is performed in a system setting screen (not shown) with regard to which of the response rate or the service level should be calculated and displayed.

The present invention is not limited to the abovementioned embodiment; alterations, improvements, etc. within a scope that can achieve the object of the invention are included in the present invention.

In the abovementioned embodiment, the graph selection receiving unit 41 and the coordinate receiving unit 43 receive a touch operation to the input unit 16 configured by a touch-screen; however, the present invention is not limited thereto. For example, with regard to the graph selection receiving unit 41 and the coordinate receiving unit 43, the input unit 16 can also be configured by units other than a touch panel. In this case, the input unit 16 can be configured to receive an operation in accordance with the type of input unit 16, for example, to receive an operation such as a click operation to the information displayed on the display unit 17, or an input operation using a keyboard.

In the abovementioned embodiment, the timeline included in the line image 111*b* passes through a single coordinate (a single point in time) in the time axis; however, the present invention is not limited thereto. For example, a timeline may pass through a single coordinate in the vertical axis, i.e. predetermined call volume (measure). In this case, since this timeline can be utilized as, for example, an indication of a threshold value of call volume (measure), the user can easily visually compare graphs of respective types as to whether the threshold value is exceeded.

In the abovementioned embodiment, only one type of graph is displayed in the graph display area 111; however, the present invention is not limited thereto. For example, the graph display area 111 may be divided into N screens (N is an integer of at least 2), and N graphs may be displayed in the divided screens, respectively. In this case, the user can designate an arbitrary coordinate (for example, predetermined time) in a predetermined axis (for example, a time axis) in an arbitrary single type of graph G In this case, the timeline can be combined with the single type of graph thus designated; alternatively, the timeline can be rendered through an identical coordinate (identical time) in a predetermined axis of another type of graph (another divided screen).

In the abovementioned embodiment, the graph G is displayed in the space configured by the vertical axis and the horizontal axis in the graph display area 111; however, the present invention is not limited thereto. For example, the present invention can be applied to a three-dimensional graph displayed in a three-dimensional space, in which a Z axis is added to the vertical X axis and the horizontal Y axis. More specifically, for example, the graph image generation unit 42 can also construct a three-dimensional space with an axis representing a predetermined frequency, a time axis, and an additional axis representing predetermined information, and can generate data of a graph image rendered as a graph in the three-dimensional space.

In the abovementioned embodiment, a touch-screen tablet is described as an example of the display controller 1, to which the present invention is applied; however, the present invention is not limited thereto in particular.

For example, the present invention can be applied to electronic devices having a display function in general. More specifically, for example, the present invention can be applied to a laptop personal computer, a television receiver, a video camera, a portable navigation device, a cellular telephone device, a portable gaming machine, etc.

The sequence of processing described above can be executed by hardware and/or software.

In other words, the functional configuration shown in FIG. 2 is merely an exemplification, and is not limited thereto in particular. In other words, it is sufficient for the display controller 1 to include a function capable of executing the aforementioned sequence of processing as a whole, and which functional block should be used to implement the function is not particularly limited to the example shown in FIG. 2.

A single functional block may be configured by a single piece of hardware, a single piece of software, or a combination thereof.

In a case in which a sequence of processing is executed by software, a program configuring the software is installed from a network or a recording medium into a computer, etc.

The computer may be a computer incorporated into specialized hardware. The computer may be a computer such as a general-purpose personal computer capable of executing various functions by installing various programs.

The storage medium containing such a program is not only configured by the removable medium 31 shown in FIG. 1 distributed separately from the device main body for supplying the program to the user, but may also be configured by a storage medium or the like provided to the user in a state incorporated in the device main body in advance. The removable medium 31 is configured by, for example, a magnetic disk (including a floppy disk), an optical disk, a magnetic optical disk, or the like. The optical disk is configured by, for example, a CD-ROM (Compact Disk-Read Only Memory), a DVD (Digital Versatile Disk), or the like. The magnetic optical disk is configured by an MD (Mini-Disk) or the like. The storage medium provided to the user in a state incorporated in the device main body in advance is configured by, for example, the ROM 12 shown in FIG. 1, a hard disk included in the storage unit 18 shown in FIG. 1 or the like, in which the program is recorded.

In the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely examples, and do not limit the technical scope of the present invention. Other various embodiments can be employed for the present invention, and various modifications with omissions and replacements are possible within a scope that does not depart from the spirit of the present invention. Such embodiments and modifications are included in the scope of the invention and the summary described in the present specification, and are included in the invention recited in the claims as well as an equivalent scope thereof.

What is claimed is:

1. A display controller, comprising:
    a processor; and
    memory coupled to the processor; the memory storing instructions that, when executed, cause the processor to perform actions including:
        receiving, from an input device coupled to the processor, a user selection of a type of graph that is selected as a display object from among a plurality of types of graphs stored in the memory;
        generating a graph image by constructing a predetermined dimensional space defined by at least two axes, and generating data of the graph image in the dimensional space, in accordance with the type of graph selected by the user;
        receiving, from the input device, a user designation of a selected coordinate along a selected axis from the at least two axes defining the dimensional space;
        generating data of a line image, the line image including a line passing through the selected coordinate on the selected axis;
        generating a first synthesized image by combining the data of the graph image with the data of the line image;
        causing a display unit coupled to the processor to display the first synthesized image; and
        in response to the user performing a predetermined operation with the input device while the first synthesized image is displayed, generating data of a graphical user interface allowing the user to input information related to the line image, combining the data of the graph image, the data of the line image, and the data of the graphical user interface to generate a second synthesized image, and causing the display unit to display the second synthesized image.

2. The display controller according to claim 1,
    wherein the first synthesized image includes information of an intersection of the line with the graph.

3. The display controller according to claim 2,
    wherein generating a graph image comprises generating data of a graph image having a plurality of graphs including the type of graph selected by the user, and
    wherein the first synthesized image includes information of intersections of the line with each of the plurality of graphs.

4. The display controller according to claim 3,
    wherein the selected axis is a time axis, and the selected coordinate is a particular time.

5. The display controller according to claim 4,
    wherein the first synthesized image includes predetermined information corresponding to the selected coordinate.

6. The display controller according to claim 3,
    wherein the first synthesized image includes predetermined information corresponding to the selected coordinate.

7. The display controller according to claim 2,
    wherein the selected axis is a time axis, and the selected coordinate is a particular time.

8. The display controller according to claim 2,
    wherein the first synthesized image includes predetermined information corresponding to the selected coordinate.

9. The display controller according to claim 1,
    wherein the selected axis is a time axis, and the selected coordinate is a particular time.

10. The display controller according to claim 1,
    wherein the first synthesized image includes predetermined information corresponding to the selected coordinate.

11. A display control method executed by a display controller coupled to a display unit, the method comprising:
    receiving, from an input device coupled to the display controller, a user selection of a type of graph that is selected as a display object from among a plurality of types of graphs stored in a memory of the display controller;
    generating a graph image by constructing a predetermined dimensional space defined by at least two axes, and generating data of the graph image in the dimensional space, in accordance with the type of graph selected by the user;
    receiving, from the input device, a user designation of a selected coordinate along a selected axis from the at least two axes defining the dimensional space;
    generating data of a line image, the line image including a line passing through the selected coordinate on the selected axis;
    generating a first synthesized image by combining the data of the graph image with the data of the line image;
    causing the display unit to display the first synthesized image; and
    in response to the user performing a predetermined operation with the input device while the first synthesized image is displayed, generating data of a graphical user interface allowing the user to input information related to the line image, combining the data of the graph image, the data of the line image, and the data of the graphical user interface to generate a second synthesized image, and causing the display unit to display the second synthesized image.

12. A non-transitory computer-readable medium storing a program which, when executed, causes a display controller to control a display unit, the process comprising:
    receiving, from an input device coupled to the display controller, a user selection of a type of graph that is selected as a display object from among a plurality of types of graphs stored in a memory of the display controller;
    generating a graph image by constructing a predetermined dimensional space defined by at least two axes, and generating data of the graph image in the dimensional space, in accordance with the type of graph selected by the user;

receiving, from the input device, a user designation of a selected coordinate along a selected axis from the at least two axes defining the dimensional space;
generating data of a line image, the line image including a line passing through the selected coordinate on the selected axis;
generating a first synthesized image by combining the data of the graph image with the data of the line image;
causing the display unit to display the first synthesized image; and
in response to the user performing a predetermined operation with the input device while the first synthesized image is displayed, generating data of a graphical user interface allowing the user to input information related to the line image, combining the data of the graph image, the data of the line image, and the data of the graphical user interface to generate a second synthesized image, and causing the display unit to display the second synthesized image.

* * * * *